United States Patent

Quanrud

[11] Patent Number: 6,140,983
[45] Date of Patent: Oct. 31, 2000

[54] DISPLAY SYSTEM HAVING MULTIPLE MEMORY ELEMENTS PER PIXEL WITH IMPROVED LAYOUT DESIGN

[75] Inventor: William A. Quanrud, San Jose, Calif.

[73] Assignee: Inviso, Inc., Sunnyvale, Calif.

[21] Appl. No.: 09/311,805

[22] Filed: May 13, 1999

Related U.S. Application Data

[63] Continuation-in-part of application No. 09/079,684, May 15, 1998, and a continuation-in-part of application No. 09/311,804, May 13, 1999.

[51] Int. Cl.[7] .................................................. G09G 3/36
[52] U.S. Cl. .............................................. 345/55; 345/205
[58] Field of Search ................................. 345/98, 100, 87, 345/88, 89, 90, 91, 92, 93, 55, 204, 205, 206; 349/73, 74, 139, 149, 151

[56] References Cited

U.S. PATENT DOCUMENTS

| | | | |
|---|---|---|---|
| 4,775,861 | 10/1988 | Saito | 345/93 |
| 4,890,097 | 12/1989 | Yamashita et al. | 345/93 |
| 5,373,378 | 12/1994 | Takubo et al. | 359/59 |
| 5,471,225 | 11/1995 | Parks | 345/98 |
| 5,499,062 | 3/1996 | Urbanus | 348/771 |
| 5,500,748 | 3/1996 | Gaalema et al. | 359/55 |
| 5,508,711 | 4/1996 | Okada | 345/97 |
| 5,642,129 | 6/1997 | Zavracky et al. | 345/100 |
| 5,644,340 | 7/1997 | Harney | 345/212 |
| 5,673,061 | 9/1997 | Okada et al. | 345/89 |
| 5,682,174 | 10/1997 | Chiu | 345/84 |
| 5,712,652 | 1/1998 | Sato et al. | 345/90 |
| 5,757,348 | 5/1998 | Handschy et al. | 345/89 |
| 5,793,363 | 8/1998 | Takuwa | 345/205 |
| 5,798,746 | 8/1998 | Koyama | 345/98 |

*Primary Examiner*—Xiao Wu
*Attorney, Agent, or Firm*—David J. Weitz; Wilson Sonsini Goodrich & Rosati

[57] ABSTRACT

A display matrix is provided comprising a plurality of display elements, each display element including a pixel, and a display circuit electrically connected to the pixel and at least partially positioned outside of a footprint of the pixel, the display circuit including a plurality of memory cells, and a selector continuously electrically connected to more than one of the plurality of memory cells, the selector outputting to the pixel data from one memory cell at a time.

29 Claims, 21 Drawing Sheets

MSB  most significant bit
SSB  second significant bit
LSB  least significant bit

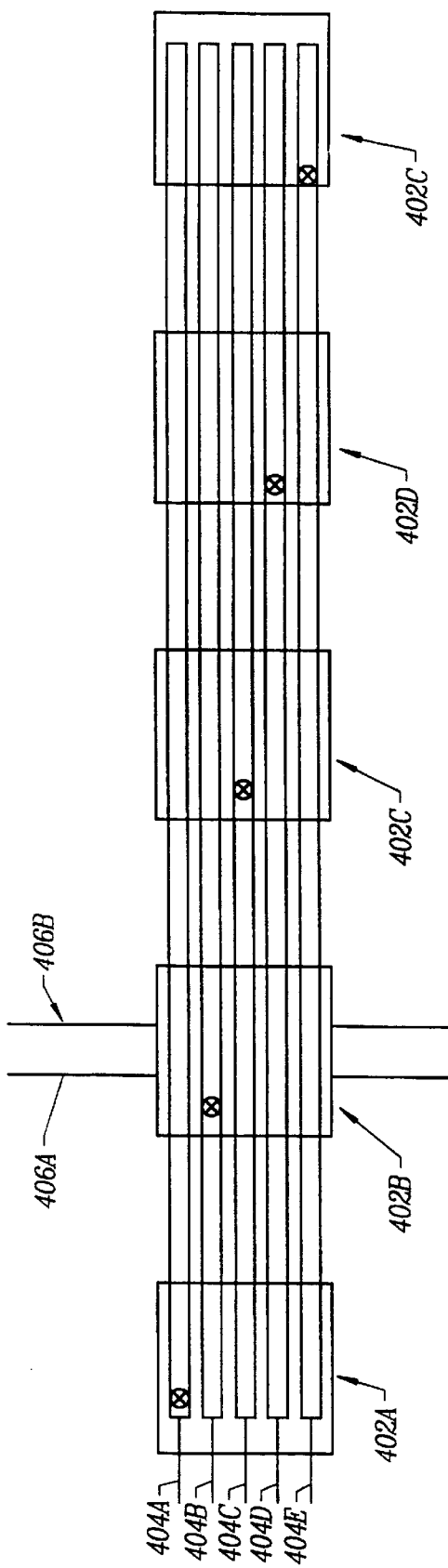
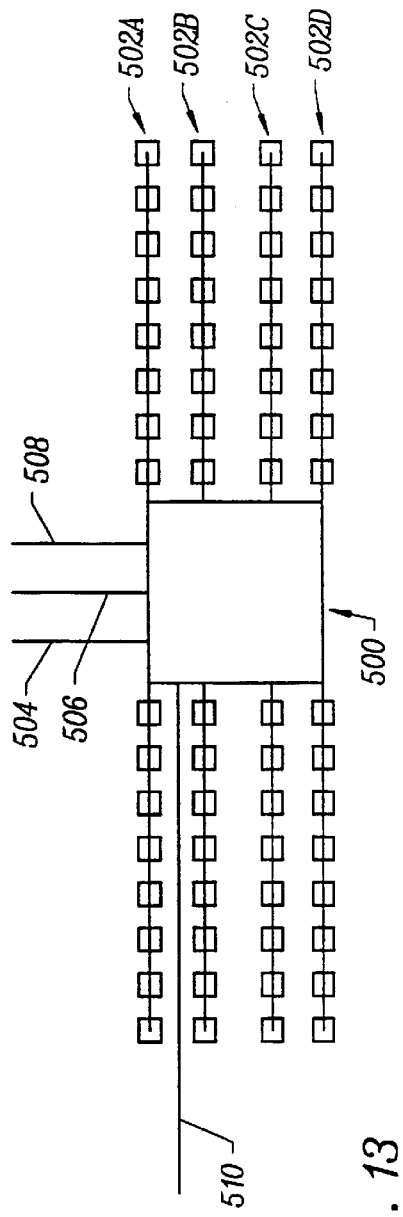
FIG. 12
FIG. 13

| | Key | | | |
|---|---|---|---|---|
| R | G | B | Color | Pixel |
| 0 | 0 | 0 | White | W |
| 0 | 0 | 0 | Cyan | C |
| 1 | 1 | 0 | Magenta | M |
| 0 | 1 | 0 | Blue | B |
| 1 | 0 | 1 | Yellow | Y |
| 0 | 0 | 1 | Green | G |
| 1 | 1 | 1 | Red | R |
| 1 | 1 | 1 | Black | Blk |

FIG. 15B-1

DISPLAY SYSTEM HAVING MULTIPLE MEMORY ELEMENTS PER PIXEL WITH IMPROVED LAYOUT DESIGN

RELATIONSHIP TO COPENDING APPLICATION

This application is a continuation-in-part of "Display System Having Multiple Memory Elements Per Pixel," application Ser. No.: 09/079,684; Filed: May 15, 1998 and "Display System With Local Decoding," application Ser. No.: 09/311,804; Filed: May 13, 1999 which is incorporated herein by reference.

BACKGROUND OF THE INVENTION

1. Field of the Invention

The invention generally relates to a display system for producing an image and more specifically to a display system for providing a sequentially produced composite image.

2. Description of Related Art

A continuing objective in the field of electronics is the miniaturization of electronic devices. Most electronic devices include an electronic display. As a result, the miniaturization of electronic displays is critical to the production of a wide variety of compact electronic devices.

The purpose of an electronic display is to provide the eye with a visual image of certain information. This image may be provided by constructing an image plane composed of an array of picture elements (or pixels) which are independently controlled as to the color and intensity of the light emanating from each pixel. The electronic display is generally distinguished by the characteristic that an electronic signal is transmitted to each pixel to control the light characteristics which determine the pattern of light from the pixel array which forms the image.

Two examples of electronic displays are the cathode ray tube (CRT) and the active-matrix liquid crystal display (AMLCD). There are other electronic displays, but none are so well developed as the CRT and AMLCD which are used extensively in computer monitors, televisions, and electronic instrument panels. The CRT is an emissive display in which light is created through an electron beam exciting a phosphor which in turn emits light visible to the eye. Electric fields are used to scan the electron beam in a raster fashion over the array of pixels formed by the phosphors on the face plate of the electron tube. The intensity of the electron beam is varied in an analog (continuous) fashion as the beam is swept across the image plane, thus creating the pattern of light intensity which forms the visible image. In a color CRT, three electron beams are simultaneously scanned to independently excite three different color phosphors respectively which are grouped into a triad at each pixel location.

In contrast to the emissive type displays such as the CRT, an AMLCD display utilizes a lamp to uniformly illuminate the image plane which is formed by a thin layer of liquid crystal material laminated between two transparent conductive surfaces which are comprised of a pattern of individual capacitors to create the pixel array. The intensity of the illumination light transmitted through each pixel is controlled by the voltage across the capacitor, which is in turn controlled by an active transistor circuit connected to each pixel. This matrix of transistors (the active matrix) distinguish the AMLCD from the passive matrix liquid crystal devices which are strictly an array of conductors controlled by transistors external to the image area usually in the periphery of the matrix. The ability of each transistor to control the characteristics of just one pixel allows for the higher performance found in AMLCD displays in contrast to the passive arrays.

In AMLCD displays, the electronic signals which control the images are transmitted to the pixel from driver circuits along the edges of the rows and columns. Typically when a row of image data has been assembled in the form of an analog voltage signal at each column driver at the edge of the columns, an enabling signal to the corresponding row driver activates the transistor connected to each pixel in that row to pass the voltage onto the capacitor forming the pixel. This storage mechanism is similar to dynamic memory cells (DRAM) although the cells are typically addressed serially (rasterwise) rather than randomly as DRAM implies.

In most displays, the electronic activation of the image must be continuous or persistent through repetition. In the CRT and emissive displays in general, a constant or highly repetitive source of energy must be applied to the pixel to create photon emission. Phosphor decay times are typically a few milliseconds. Similarly, the capacitors in the AMLCD array lose their charge through leakage and accurate grayscale levels are lost. Furthermore, many liquid crystal materials exhibit ion migration and must be reversed in polarity with each refresh cycle. In general, displays with limited persistence must be refreshed frequently to avoid noticeable brightness variation known as flicker. On the other hand, displays with substantial persistence cannot display moving images without ghost images. Refreshing the image of most displays requires repeated transmission of the image data to the display, either from the broadcast source or from a storage device.

Not all electronic products which contain an electronic display have memory for storing the data which is to be displayed. For instance, a television must activate the CRT display in real time as the broadcast signal is received unless a VCR or similar storage medium is employed. In computers, data is transmitted and stored digitally. Moreover, in portable electronics devices, size and power constraints require the use of semiconductor memory which stores data only in digital format. In digital electronic products, it is typical that a display controller is incorporated to receive and store the bit mapped image to be displayed and then to transfer that data to the display in a series of image frames at a rate high enough to look smooth to the eye. The semiconductor memory storing the image bits is called the frame buffer, and the rate at which the data is refreshed on the display is called the frame rate.

It is an advantage in many applications to display large amounts of information requiring more and more resolution in the display. High resolution displays may contain hundreds of thousands of pixels. As an example, the Super VGA (SVGA) display resolution consists of 480,000 pixels. With a simple monochrome image and no grayscale, the frame storage is only equal to the approximately one-half megabit frame size. However, were the image to be full 24 bit depth color (i.e.,3 colors and 8 bits of grayscale per color), the frame storage would approach 12 megabits. At the frame rates which are common today for high performance displays, at least 60 frames per second and up to 85 frames per second, as many as one gigabits per second must be transferred from the frame buffer to the display. The state of semiconductor technology at present limits clock speeds to a level well below such transfer rates and parallel interfaces of 16 to 32 bit widths are typical in high performance displays.

It is a characteristic of analog displays that when the image data is stored in semiconductors, the digital information is converted to analog in a digital-to-analog converter (DAC) at the interface of the display. The digital representation of a pixel at the high standard of 8 bits of grayscale allows the creation of 256 separate shades per color (16 million distinct colors). In high performance displays, multiple DAC channels are required to provide the bandwidth of data transfer required.

As was noted above, most displays must be frequently rewritten to maintain an image. In the case of both CRT and AMLCD displays, data is being rewritten to one part of the display area while the rest of the array continues to display the prior image frame. This property is particular to monochrome displays and to color images are created from a composite of spatially separated sub-pixels. There is a clear advantage to writing and displaying data at the same time allowing each function to make maximum utilization of time allowed for each frame.

Once data corresponding to an image is transferred to a display via electronic signals, there is an advantage to the display device being able to maintain the image unless a portion of the image must be altered to provide motion to the image. The amount of data written to the display in each subsequent frame can be substantially reduced if the writing operation is organized to be random, such as to write data to any location in the array and only to those locations where the data is changing for reasons that the image is moving or for reasons the array is reused sequentially to create a composite image. To achieve this end however, pixel locations which are not being rewritten must be able to store data and continually display it.

There exists a class of displays, primarily MEMS electromechanical devices and certain polymeric dispersed cholesteric liquid crystals, which are inherently bistable due to nonlinearities of the electro-optic response curve. In these displays, image storage within the device itself can be indefinite although without color or grayscale. Further, such devices cannot inherently provide grayscale in response to analog signals. However, grayscale can be achieved through time division of the image frame into a multiplicity of on and off states which on average provide a shade proportional to the signal pattern.

Similarly, in an active matrix display a multiplicity of transistors may be provided in correspondence to each pixel such that a static memory (SRAM) cell (typically four or six transistors) can be utilized to activate each pixel. There are several advantages to static memory such as the on-state output voltage always being at the rail voltage, the low activation current, no voltage decay, and sufficient signal to noise to read from the memory cells any stored data. However, because a static memory cell is itself bistable, the pixel activation will provide no analog grayscale.

In general, displays with no analog response fall into two categories. Those displays with an extremely fast response in relation to the time divisions of the on-off cycles (as is typical of MEMS devices) can achieve grayscale through pulse width modulation. Those displays with a relatively slow response time in relation to on-off cycles (as is typical of liquid crystal devices) can achieve grayscale through a root mean square (RMS) voltage level based on the average time-voltage product. In both cases however, there is a disadvantage in comparison to analog grayscale methodologies, that being the loss of parallelism of the data transfer of the grayscale bits. Data transfer rates from frame buffers to a binary display device can be significantly higher than an analog display.

In the particular case of miniaturization of high resolution electronic displays, there is an advantage to reducing the size of the pixels which comprise the display. The need for such small devices has led to the development of a category of miniature displays often described as microdisplays with pixel sizes as small as 10 microns. In order to achieve this pixel resolution, active matrix devices have been developed utilizing silicon wafer fabrication of CMOS devices as opposed to thin-film transistors fabricated on a glass or quartz substrate. Single crystal silicon design rules are many times smaller than poly-silicon resulting in transistor sizes to easily fit microdisplay geometries. With the exception of techniques to separate the single crystal transistors from the silicon substrate utilizing lift-off technology, CMOS based active matrix displays are inherently opaque, and therefore must be reflective rather than transmissive like the poly-silicon devices. Thin film transistor (TFT) based transmissive devices are also opaque as transistors and interconnection lines, and optical efficiencies are very low for high resolution TFT displays.

The pixel sizes of microdisplays are too small to be directly viewed by the unaided eye, but can be magnified through projection optics to create a real image on a screen or wall or through a magnifier to create a virtual image in space. In practice, pixel sizes are limited today by magnifier and illumination considerations to geometries which are larger than single crystal silicon transistors, and in particular, useful pixels are even larger than multi-transistor SRAM cells.

The pixel sizes are also small relative to the size of color filters used in TFT AMLCD displays to create color triads for each pixel. There is a significant advantage to creating color through the sequential use of the entire array to create an image specific to each of the three prime color components. Through the utilization of separate light emitting diodes of each prime color to illuminate the display, the diodes can be turned rapidly on and off to correspond to the particular color component being displayed by the array at that moment. This method of color creation is called field sequential color wherein each color field is sequentially illuminated by the appropriate diode.

An important limitation of the field sequential color method is that data for the next color field cannot be written while the current color field is being illuminated. As a result, the time available to write to the display is limited and must be substantially less than the time allowed to illuminate each particular field's color.

Because at least three different color images need to be displayed at a rate faster than can be resolved by the eye, the field sequential color method at least triples the frame rate required as compared to a monochrome display.

A need exists for a display system which can overcome the various above-described limitations of prior art display systems and be able to produce a high resolution field sequential color image which is not limited by the frame transfer rate limitations of existing display matrices. The display system should also be adaptable for use as a microdisplay.

A significant aspect of a compact electronic device is its portability. It is impractical and disadvantageous for a compact electronic display to rely on an external power source. Rather, compact electronic displays must rely on an internal battery for energy. It is important to the usefulness and reliability of the electronic display that the display be energy efficient so that the battery life of the display is optimized. A need thus exists for an energy efficient display for use in portable electronic devices.

These and other advantages are provided by the display system of the present invention.

SUMMARY OF THE INVENTION

A display matrix is provided for forming a composite image from a series of sub-images. In general, the display matrix includes a plurality of display elements, each display element including a pixel, and a display circuit electrically connected to the pixel. Each display circuit includes a plurality of memory cells, and a selector for outputting to the pixel data from one memory cell at a time.

According to one aspect of the display matrix of the present invention, a plurality of memory cells in the display circuit are continuously electrically connected to the selector of the display circuit at the same time. As a result, there is no need to address a particular memory cell to a particular selector. This may be accomplished, for example, by the display circuit including separate conductive elements for each memory cell in the display matrix which electrically connects a memory cell to the selector in the display circuit.

According to another aspect of the display matrix of the present invention, the display matrix is formed on a substrate having a plurality of regions where each region includes a memory circuit with a plurality of memory cells, and a selector electrically connected to the plurality of memory cells in the region. The substrate may be any material on which the display circuit may be attached or formed. In a preferred embodiment, the substrate is a semiconductor, such as silicon, on which the display circuits are formed by one or more of a variety of methods known in the art.

According to this aspect, the memory cells are physically interdispersed among the selectors within the plurality of display elements. In this regard, the memory associated with the display matrix is integrated into the display matrix as opposed to be external to the display matrix and the selectors.

According to the present invention, at least a portion of the display circuits of the display matrix include at least 2 memory cells per display circuit. In one embodiment, at least a portion of the display circuits of the display matrix include at least 3 memory cells per display circuit. The display matrix may optionally include 4–18 or more memory cells per display circuit, depending on a variety of factors which will be discussed herein.

In a preferred embodiment, the display matrix has sufficient memory such that data can be transferred to the display matrix for one sub-image while a different sub-image is displayed. The display matrix may also have sufficient memory to display two or more different sub-images without having to write to the memory cells between displaying the different sub-images. The plurality of memory cells in each circuit can represent different bits of a digital grayscale value. It is possible to vary the digital grayscale value significance of a particular memory cell image to image and field to field. The plurality of memory cells in each circuit can represent bits of different color fields.

In one embodiment, the display circuit can be operated in a field sequential color (FSC) mode without having to write to the memory cells between displaying different fields. This enables the display matrix to not need an external frame buffer. The display matrix may optionally be configured to be operated in a field sequential color (FSC) mode without having to write to the memory cells between displaying different fields.

Data preferably can be both written to and read from the memory cells. In one embodiment, data for forming a sub-image can be written randomly to the memory cells. In a particular variation, the memory cells are static random access memory (SRAM) cells.

In one embodiment, the display matrix is sized to form a microdisplay. According to this variation, the pixels in the plurality of display elements may form a source object having an area equal to or less than about 400 mm$^2$ and preferably between about 20 mm$^2$ and 100 mm$^2$. The pixels of the display matrix preferably have an area less than about 0.01 mm$^2$ and more preferably between 50 $\mu$m$^2$ and 500 $\mu$m$^2$.

The present invention also relates to a display system which includes a display matrix according to the present invention and peripheral control circuits for controlling read and write operations to the memory cells. The display system may also include an illumination source for illuminating the pixels. In one embodiment, the display includes a light emitting mechanism provided at each pixel. The display system may also include a light modulating mechanism, such as a liquid crystal material, provided at each pixel.

The display system may optionally further include logic for reading, inverting and rewriting data stored in the memory cells to provide a refresh cycle, a processor for reading, modifying, and rewriting data stored in the memory cells to compose a bit mapped image without the need of an external frame buffer, control circuits for reading, modifying, and rewriting data stored in the memory cells to provide a cursor function. The peripheral control circuits may also serve to read, move, and rewrite data stored in the memory cells to provide a scroll function.

The display system may also include an illumination source capable of providing a plurality of different color illumination to the pixels, the particular color illumination provided to the pixels being coordinated by the peripheral control circuits with the read and write operations to the memory cells. Two, three or more different colors of illumination may be provided. The illumination source preferably provides at least three different colors of illumination.

The display matrices and display systems of the present invention may be used in a display component of a variety of electronic devices. Examples of such devices include, but are not limited to portable computers, personal communicators, personal digital assistants, modems, pagers, video and camera viewfinders, mobile phones, and television monitors. In one particular embodiment, the display matrices and display systems of the present invention are used in combination with one or more magnification optics to form a virtual image display system.

The present invention also relates to methods of using the display matrices and display systems of the present invention to produce composite images as described herein.

The present invention also relates to various display matrix embodiments relating to designing an effective layout for a display matrix having a plurality of memory cells per pixel.

In one embodiment, a display matrix is provided which comprises a plurality of display elements, each display element including a pixel, and a display circuit electrically connected to the pixel and at least partially positioned outside of a footprint of the pixel, the display circuit including a plurality of memory cells, and a selector continuously electrically connected to more than one of the plurality of memory cells, the selector outputting to the pixel data from one memory cell at a time.

According to this embodiment, the plurality of memory cells includes at least 2 memory cells, more preferably at least 3 memory cells and more preferably at least 9 memory cells. In one embodiment, the plurality of memory cells includes between 2 and 9 memory cells.

Also according to this embodiment, a first display element may have a display circuit of second display element at least partially positioned inside the footprint of the pixel of the first display element.

Also according to this embodiment, the display matrix may further include a data line electronically connected to both a first display circuit of a first display element and a second display circuit of a second display element, the data line enabling reading from and writing to the first and second display circuits.

Also according to this embodiment, the display matrix may further include two or more data lines, each data line electronically connected to both a first display circuit of a first display element and a second display circuit of a second display element, the data line enabling reading from and writing to the first and second display circuits. The two or more data lines may comprise a first data line which carries a bit signal, and a second data line which carries a bit bar signal.

In another embodiment, a display matrix is provided which comprises a first display element including a first pixel, and a first display circuit including a plurality of memory cells electrically connected to the first pixel; a second display element including a second pixel, and a second display circuit including a plurality of memory cells electrically connected to the second pixel, the second display circuit being at least partially positioned within a footprint of the second pixel and within a footprint of the first pixel.

According to this embodiment, the first display circuit may be at least partially positioned within the footprint of the second pixel, the display matrix optionally including a set of data lines is electronically connected to the first display circuit and the second display circuit, the set of data lines enabling reading to and writing from the first display circuit and the second display circuit.

In another embodiment, a virtual image display system is provided comprising: a display matrix including a plurality of display elements, each display element including a pixel, and a display circuit electrically connected to the pixel and at least partially positioned outside of a footprint of the pixel, the display circuit including a plurality of memory cells, and a selector continuously electrically connected to more than one of the plurality of memory cells, the selector outputting to the pixel data from one memory cell at a time; peripheral control circuits for controlling read and write operations to the memory cells; and one or more magnification optics for magnifying the sub-images formed by the display matrix.

According to this embodiment, the virtual image display system may optionally include a light emitting mechanism provided at each pixel, a light modulating mechanism provided at each pixel, and/or an illumination source for illuminating the pixels.

In another embodiment, a virtual image display system is provided comprising: a display matrix comprising a first display element including a first pixel, and a first display circuit including a plurality of memory cells electrically connected to the first pixel, a second display element including a second pixel, and a second display circuit including a plurality of memory cells electrically connected to the second pixel, the second display circuit being at least partially positioned within a footprint of the second pixel and within a footprint of the first pixel; peripheral control circuits for controlling read and write operations to the memory cells; and one or more magnification optics for magnifying the sub-images formed by the display matrix.

In yet another embodiment, a method is provided for reducing the number of address lines in a pixel-based display system, the method comprisng: electrically connecting a plurality of display circuits to a plurality of pixels each having a footprint, the plurality of display circuits controlling the operation of the plurality of pixels; positioning the plurality of display circuits relative to the plurality of pixels such that at least a portion of the plurality of display circuits are not entirely positioned within the footprint of a single pixel; and connecting data lines to the plurality of data circuits to read and write data to the plurality of data circuits.

According to another embodiment, a display matrix is provided having a plurality of pixels and a plurality of display circuits which control operation of the plurality of pixels. The display matrix comprises two or more groups of display circuit clusters, each cluster including one or more display circuits electronically connected to a first address line and one or more display circuits electronically connected to a second address line different from the first address line; and an address decoder electronically connected to the display circuits in the cluster which selects between the one or more display circuits electronically connected to the first address line and the one or more display circuits electronically connected to the second address line.

According to this embodiment, the address decoder may be connected to one or more sub-address lines which selects one or more display circuits in the cluster. Also according to this embodiment, the address decoder may be connected to an enable line which signals an enabled/disabled state to the address decoder. Also according to this embodiment, the matrix may include display circuit clusters electronically connected to at least four address lines, the address decoder selecting between the at least four address lines. Also according to this embodiment, each display circuit may comprise a plurality of memory cells, and a selector continuously electrically connected to more than one of the plurality of memory cells, the selector outputting to the pixel data from one memory cell at a time.

According to another embodiment, a display matrix is provided which comprises: a plurality of display circuits which control operation of a plurality of pixels, the plurality of display circuits including a first group of display circuits including at least one display circuit electronically connected to a first address line and at least one display circuit electronically connected to a second address line different from the first address line, a second group of display circuits including at least one display circuit electronically connected to a third address line and at least one display circuit electronically connected to a fourth address line different from the third address line; a first address decoder electronically connected to the first group of display circuits which selects one or more display circuits from the first group of display circuits; and a second address decoder electronically connected to the second group of display circuits which selects one or more display circuits from the second group of display circuits.

According to this embodiment, the first or second address line may be the same address line as the third or fourth address line. Also according to this embodiment, the first address line and the second address line may be fabricated in poly-silicon. Also according this embodiment, a set of data lines may be connected to two or more display circuits of the plurality of display circuits.

A method is also provided for reducing a number of address lines in a display matrix. According to one embodiment of the method, the display matrix is constructed so that display circuits are arranged in rows. Local address decoders are positioned in the display matrix so that each local decoder is connected to a plurality of rows of display circuits, wherein the local address decoder selects individual rows from the plurality of rows. Address lines are formed such that each of the local decoders is in electronic communication with an address line.

According to this method, the method may further comprise forming sub-address lines, wherein each local decoder is connected to one or more sub-address lines, and the one or more sub-address lines signal a row to be selected by the local decoder.

In another embodiment, a display matrix is provided comprising a plurality of display elements, each display element including a pixel; and a display circuit electrically connected to the pixel, the display circuit including a plurality of memory cells; and a selector continuously electrically connected to more than one of the plurality of memory cells, the selector outputting to the pixel data from one memory cell at a time; wherein at least one component of the selector and at least one component of the memory cells are fabricated using a same fabrication tool.

In another embodiment, a display matrix is provided which comprises a plurality of display elements, each display element including a pixel, and a display circuit including a plurality of memory cells electrically connected to the pixel; and a plurality of strobe lines which control communication between display circuits and the plurality of pixels; wherein at least a portion of the plurality of strobe lines are operatively connected to at least two display elements.

According to this embodiment, the display circuit may optionally further include a selector which controls communication between the plurality of memory cells and the pixel. The selector may comprise a plurality of switches connected to the plurality of memory cells. The selector may be controlled by the portion of the plurality of strobe lines.

BRIEF DESCRIPTION OF THE DRAWINGS

FIG. 7A illustrates a virtual image display system which includes a display matrix which projects an image onto a back surface of the first magnification optic which reflects (at least partially by total internal reflection) the image to a surface having a magnification function and a reflection function.

FIG. 7B illustrates a virtual image display system which includes an illumination source which reflects light off the microdisplay system to a beamsplitter which reflects an image formed by the microdisplay to a surface of the first magnification optic having a magnification function and a reflection function.

FIG. 7C illustrates a virtual image display system which includes an illumination source which reflects light off the microdisplay system to a back surface of a first magnification optic which reflects the light to a beamsplitter which reflects the light to a surface of the first magnification optic having a magnification function and a reflection function.

FIG. 8B illustrates that it is possible to display multiple sub-images of a frame, optionally all the sub-images of a frame, without having to transfer any data into memory.

FIG. 8C illustrates that it is possible to display one sub-image while transferring data for another sub-image into memory.

FIG. 12 illustrates five display circuits, each of which is partially within the footprint of each of five pixels, wherein a single set of data lines is connected to all five data circuits.

FIG. 13 illustrates a local decoder connected to four rows of data circuits.

DETAILED DESCRIPTION OF THE INVENTION

The present invention relates to a display matrix for forming sequentially formed composite images. As used herein, a sequentially formed composite image is an image formed by displaying a series of two or more different sub-images to an observer where the different sub-images are displayed one sub-image at a time on the display matrix. These display matrices can be used in a display system component of a variety of electronic devices. Examples of such devices include, but are not limited to portable computers, personal communicators, personal digital assistants, modems, pagers, video and camera viewfinders, mobile phones, and television monitors. In one particular embodiment, the display matrices and display systems of the present invention are used in combination with one or more magnification optics to form a virtual image display system.

A unique property of the display matrix of the present invention is that data for a plurality of sub-images may be stored in the display matrix simultaneously. This property eases the instantaneous bandwidth requirements of the display matrix and, in certain situations, actually decreases the amount of data which must be transferred to the display matrix from external memory locations.

In general, a display system forms a sequentially formed composite image by displaying a series of sub-images to an observer at a rate preferably faster than the eye of the observer can resolve. Image quality is reduced if the eye is able to perceive an individual field sub-image, a phenomena known as flicker. In practice, it has been found that frame rates in excess of 60 Hz are necessary to avoid flicker.

Ideally, the data for any sub-image should be present in the display matrix from the beginning until the end of the display of the sub-image. If the display matrix houses only a single sub-image at a time, then ideally the entire data transfer should take place between the display of one sub-image and the next. This places high instantaneous bandwidth requirements on the system in order to transfer all of the data for a sub-image in the interval between the display of sub-images.

Figure 1:
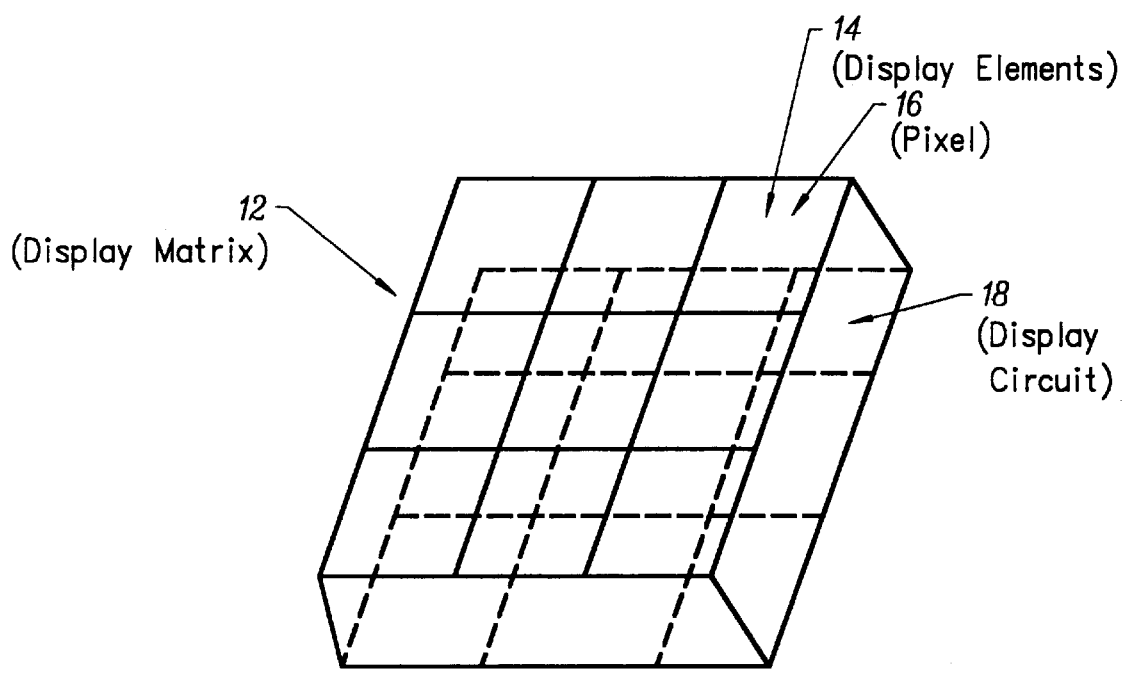
FIG. 1 illustrates a display matrix.

FIG. 1 illustrates a typical display matrix 12 which includes a plurality of display elements 14. Each display element 14 includes a pixel 16 and a display circuit 18 which is electrically connected to the pixel and controls the operation of the pixel 16. The plurality of pixels incorporated into the plurality of display elements together form the source object formed by the display matrix 12.

In a display matrix according to the present invention, the display circuit consists of a plurality of memory cells and a selector. The selector is able to output to the pixel the contents of at most one memory cell at any instant. The selector is controlled by additional input signals provided to the display circuit.

Figure 2:
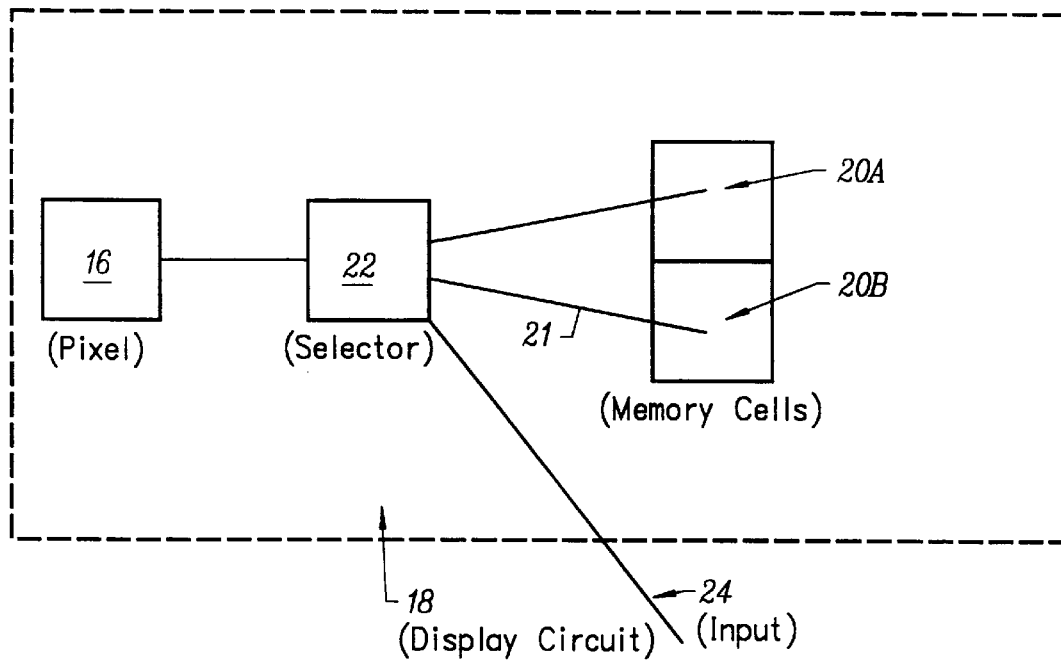
FIG. 2 illustrates a display circuit which may be used in the display matrix of the present invention.

FIG. 2 illustrates a display circuit 18 which may be used in the display matrix of the present invention. As illustrated, the display circuit 18 includes a plurality of memory cells 20A, 20B (two shown) which are each electrically connected to a selector 22. The selector controls which memory cell is electrically connected to the pixel 16. As illustrated, the display circuit 18 can also optionally receive one or more inputs 24 for controlling the operation of the selector 22.

As illustrated in FIG. 2, a feature of the display circuit and display matrix of the present invention is that a plurality of the memory cells in the display circuit are continuously electrically connected to the selector of the display circuit at the same time. As a result, there is no need to address a particular memory cell to a particular selector. This may be accomplished, as illustrated in FIG. 2, by the display circuit including separate conductive elements 21 for each memory cell in the display matrix which electrically connects a memory cell to the selector in the display circuit. The figure illustrates that all the memory cells in the display circuit are connected. It is noted that less than all of the memory cells may optionally be continuously electrically connected.

A further feature of the display circuit and display matrix of the present invention is that the display matrix is formed on a substrate having a plurality of regions where each region includes a memory circuit with a plurality of memory cells, and a selector electrically connected to each memory cell in the region. For example, FIG. 1 illustrates a plurality of display circuits in separate regions. By having a plurality of regions which each include a complete memory circuit, a display matrix is provided where the memory cells are physically interdispersed among the selectors within the display matrix. This distinguishes the display matrix of the present invention over prior art displays with an external frame buffer. The substrate may be any material on which the display circuit may be attached or formed. In a preferred embodiment, the substrate is a semiconductor, such as silicon, on which the display circuits are formed by one or more of a variety of methods known in the art.

Yet a further feature of the display matrix of the present is its ability to store more than one image at a time. Because the display circuit 18 has more than one memory cell per pixel, it is possible to display two or more different sub-images without having to write to the memory cells between displaying the different sub-images. In addition, data may be transferred to the display matrix for one sub-image while a different sub-image is displayed. Accordingly, the data transfer time for one sub-image can be spread over the entire display time of a different sub-image. This alleviates the need for a high instantaneous bandwidth or a high sub-image display rate, a clear advantage over prior art display systems.

Figure 3:
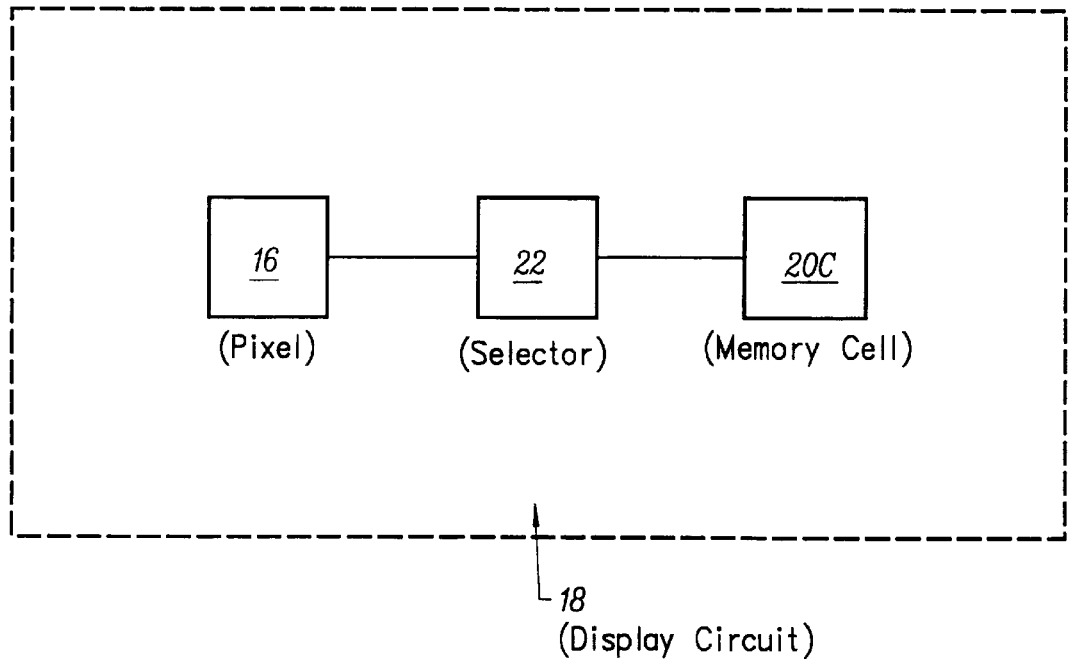
FIG. 3 illustrates a prior art display circuit.

FIG. 3 illustrates a prior art display circuit. As illustrated in FIG. 3, the prior art display circuit includes a single memory cell 20C which is connected to pixel 16. The prior art display circuit thus does not need a selector or input for controlling the operation of the selector. Further, because the display circuit only includes one memory cell 20C, a memory matrix employing this display circuit can only store data for one sub-image and thus cannot display different sub-images without having to write to the memory cells between displaying the different sub-images. When it is necessary to create an image out of a composite of sub-images, the sub-images are typically composed in a spatial relationship and written simultaneously to the matrix.

The display matrix of the present invention may be any addressable display which includes a pixel and a display circuit which controls the operation of the pixel in response to control signals. As used herein, a pixel (a contraction of picture element) refers to any mechanism which can either emit light or modulate incident light in response to an electrical field to form one element of a source object. The plurality of pixels incorporated into the plurality of display elements together form the source object formed by the display matrix.

Examples of suitable pixels include but are not limited to the pixels used in liquid crystal displays, spatial light modulators, gratings, mirror light valves, and LED arrays. The pixels can be opaque or light transmissive. Opaque pixels can be further divided into reflective, emissive, and scattering pixels.

In one embodiment of the present invention, the pixels used in the display matrix are sized to be a microdisplay. As used herein, a microdisplay refers to a display matrix which is used in a virtual image display system to form a source object which is then magnified by one or more magnification optics to form a magnified virtual image. In a preferred embodiment, the microdisplay forms a source object having an area equal to or less than about 400 $mm^2$. In one embodiment, the source object has an area between about 10 $mm^2$ and 400 $mm^2$, more preferably between about 20 $mm^2$ and 100 mm². The pixels of the display matrix preferably have an area less than about 0.01 mm² and more preferably between 50 µm² and 500 µm².

By designing a microdisplay to include a display circuit according to the present invention, microdisplays with reduced instantaneous bandwidth requirements and reduced average bandwidth are provided. The reduced bandwidth requirements translate into lower power consumption, which is particularly important for battery-powered applications in devices which incorporate microdisplays.

Figure 4A:
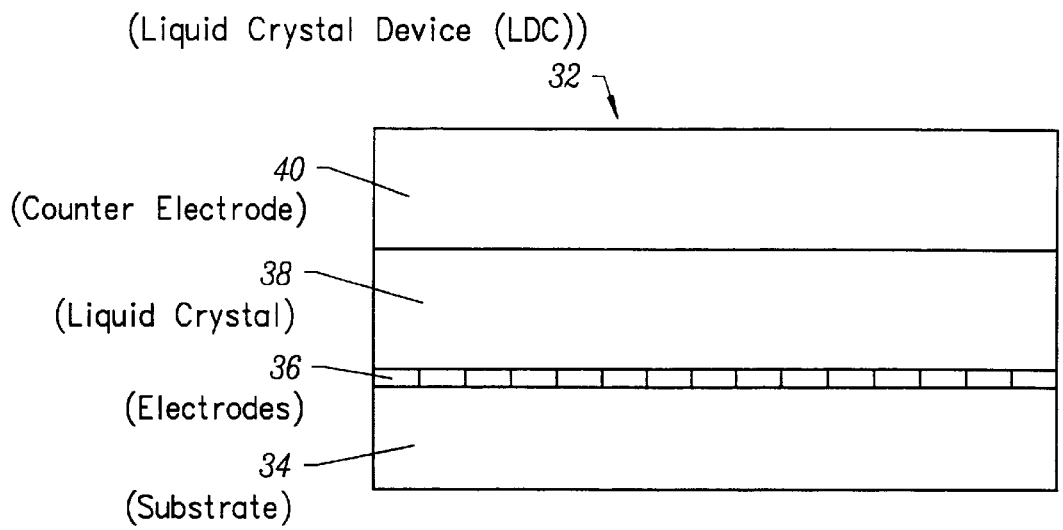
FIG. 4A illustrates a cross-sectional view of a liquid crystal device.
Figure 4B:
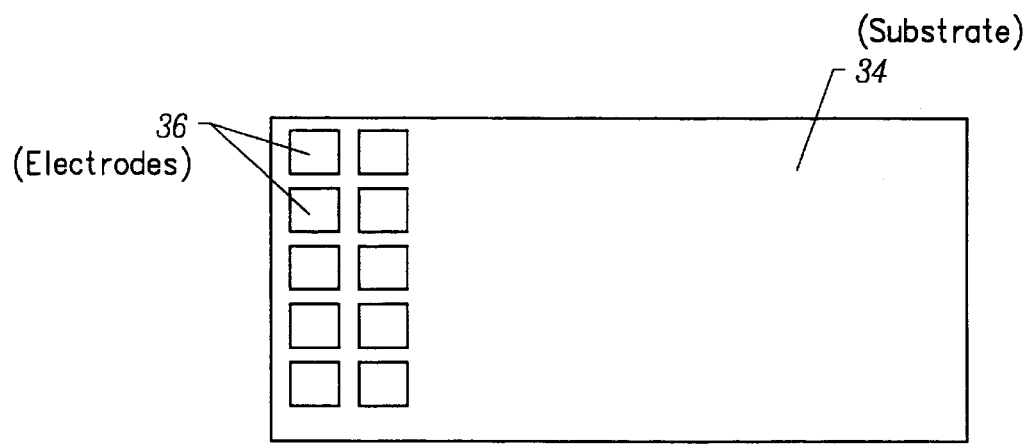
FIG. 4B illustrates a top-down view of a liquid crystal device.

In one particular embodiment, a microdisplay is provided which includes a liquid crystal device (LCD) and operates in either reflective or scattering modes. FIG. 4A illustrates a cross-sectional view of a liquid crystal device while FIG. 4B illustrates a top-down view of a liquid crystal device. As illustrated in FIGS. 4A and 4B, the LCD 32 is composed of a substrate 34 having a plurality of electrodes 36 corresponding to pixels, liquid crystal 38 arranged on the substrate 34, and a counter electrode 40 arranged on the liquid crystal 38. The liquid crystal is caused to align or relax at each pixel in response to local electric fields applied across the liquid crystal between the pixel and the counter electrode. The potential at each pixel on the substrate is determined by the corresponding display circuit, the design of which is the subject of the present invention. Sequentially changing the potentials at any or all of the pixels on the substrate via the corresponding display circuits causes the LCD as a whole to form a composite image when properly illuminated.

According to this embodiment, a sub-image is observed when the LCD is illuminated after allowing sufficient time for the liquid crystal to align or relax according to the voltage pattern on the pixels. A multicolor image may be produced by performing the following sequence sequentially with different colored illumination sources: (1) turning off illumination; (2) stimulating the liquid crystal with a voltage pattern on the pixels for a first sub-image or field; (3) waiting a sufficient period of time for the liquid crystal to form the source object; and (4) illuminating the liquid crystal. The above sequence is repeated for each light source present.

Figure 5:
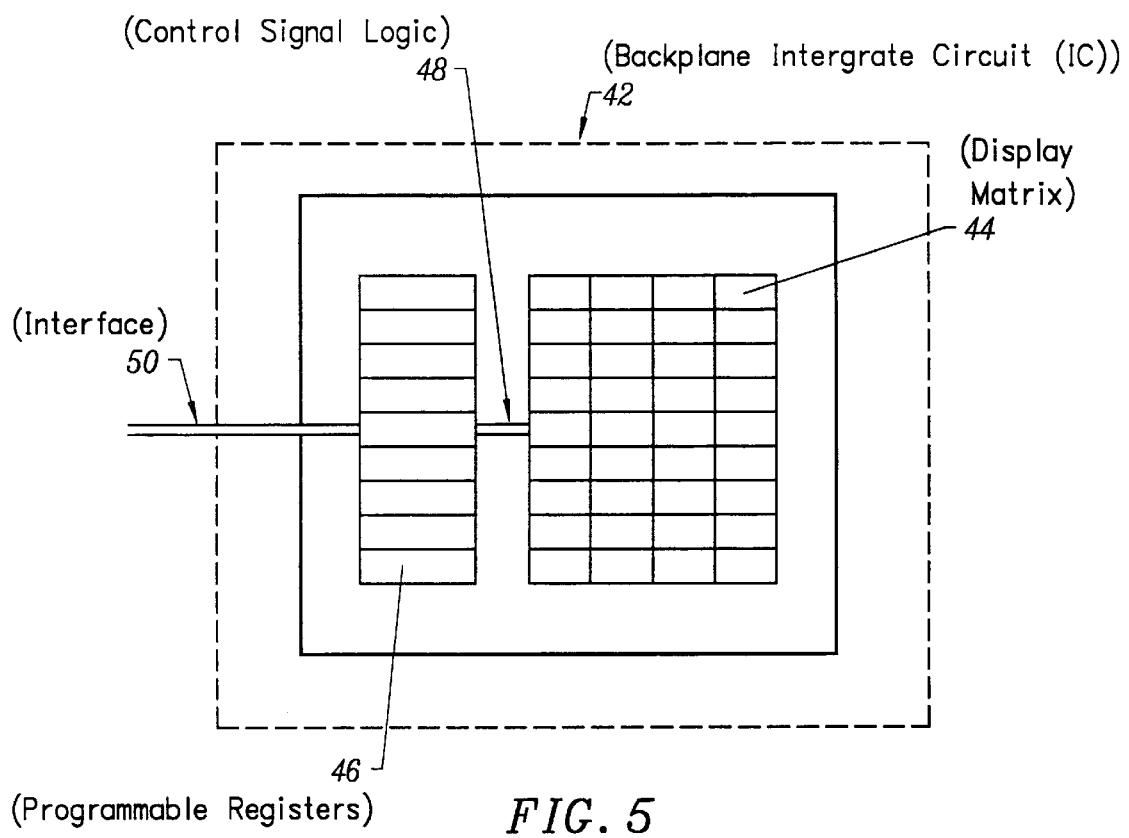
FIG. 5 illustrates a backplane integrated circuit (backplane IC) which may be used in a display matrix of the present invention.

FIG. 5 illustrates a backplane integrated circuit (backplane IC) which may be used in a display matrix such as a LCD microdisplay. As illustrated, the backplane IC 42 integrates into a single electronic circuit a display matrix 44, programmable registers 46 that generate the control signal logic 48 provided to the display matrix 44 and other timing functions, and an interface 50 to a source of image data. A display matrix for this backplane IC may be sized to include an 800 by 600 two-dimensional array of display circuits.

The display circuit for a backplane IC according to the present invention is composed of two or more memory cells and a selector circuit. The memory cells may be conventional Static Random Access Memory (SRAM) cells composed of six transistors each, though the use of other digital memory cells is intended to fall within the scope of the present invention.

Using SRAM for the memory cells facilitates fabrication of the IC. SRAM can be fabricated by the same process steps and fabrication tools as the selector circuit. For example, the selector and SRAM may be formed on a substrate with one poly-silicon layer and three or four metal layers, 1p3m or 1p4m. This obviates the need for different fabrication processes for the memory and logic components of the IC, and reduces the number of mask levels required in fabrication.

As an example of a display circuit, in a three color system, the SRAM cells may be called RED CELL, GREEN CELL, and BLUE CELL, respectively. The cells are addressed for reading and writing via WORD signals. Data is transferred into and out of the SRAM cells via BIT and BIT BAR signals.

There are two basic configurations of the three SRAM cells. The cells can share the BIT and BIT BAR data signals and have separate address signals, possibly named RED WORD, GREEN WORD, and BLUE WORD, respectively. Or the cells can share a WORD address line and have separate data signals, such as RED BIT and RED BIT BAR, etc.

The selector is accomplished with switches that connect the SRAM cells to the pixel at the output of the display circuit. The switches may be pass gates controlled by RED STROBE, GREEN STROBE, and BLUE STROBE signals, respectively. When the RED STROBE signal is asserted, the voltage stored in the RED CELL is transferred to the pixel. The GREEN STROBE and BLUE STROBE signals operate analogously. The various WORD and STROBE signals are provided to each display circuit based on programmable registers inside the backplane IC but outside the display matrix.

When the RED STROBE is asserted over the entire display matrix, a voltage pattern corresponding to the data stored in the RED CELL of every display circuit is output on the pixels. The GREEN STROBE and BLUE STROBE signals operate analogously.

In an embodiment of the present invention, each cell is connected to a individual strobe line. This design allows each cell to be strobed individually, thereby minimizing the power consumed in the operation of the display system and optimizing the operation speed of the display.

In an alternative embodiment, multiple cells are connected to individual strobe lines. This design reduces the wiring density of the IC. By varying the number of strobe lines used, the display system can be designed to have a desired level of wiring density. It is noted that power efficiency and operation speed decrease as wiring density decreases. The particular wiring density that is preferred will depend upon the particular application for which the display is being designed and the wiring density, power efficiency, and operation speed that are required.

Figure 6:
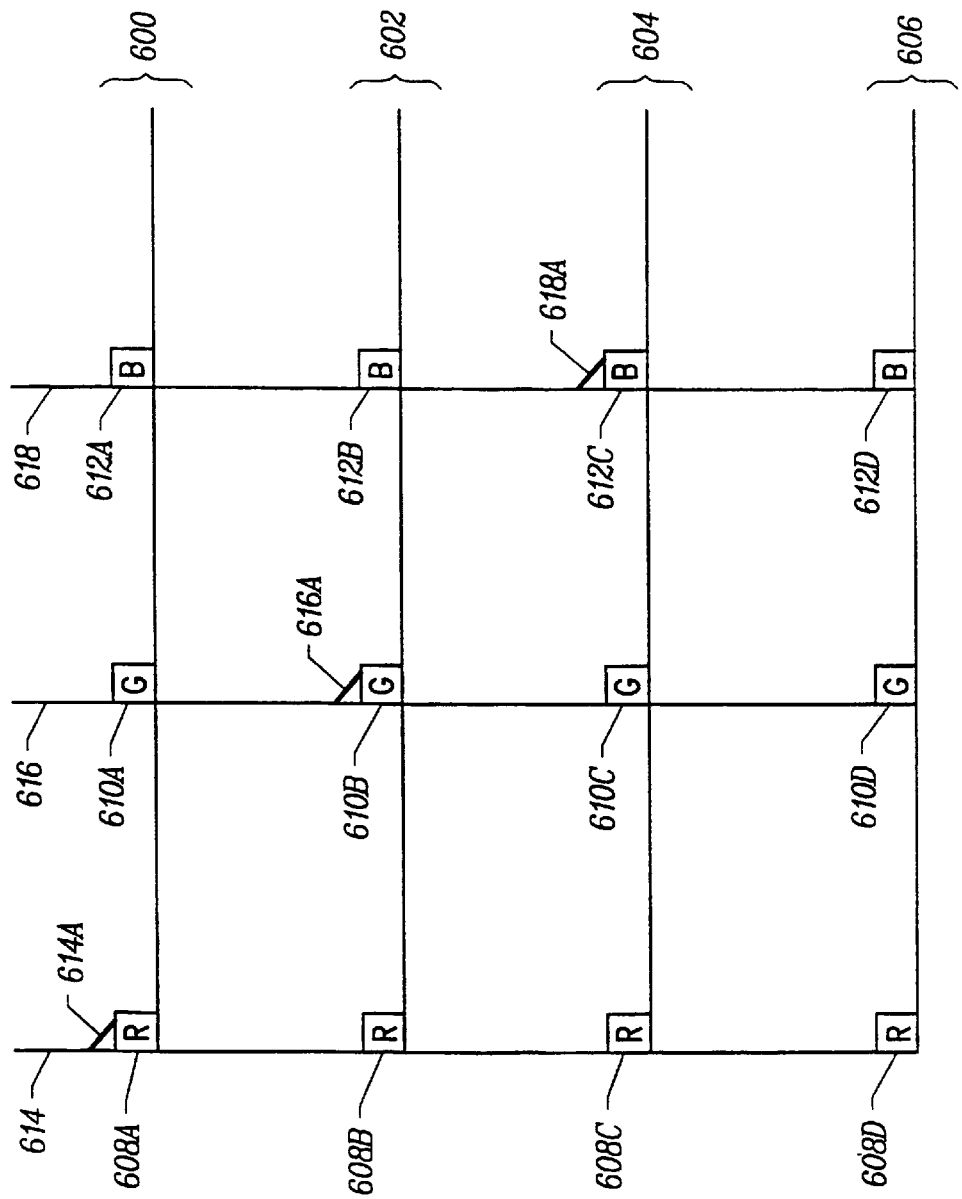
FIG. 6 illustrates a configuration of strobe lines connected to display circuits.

FIG. 6 illustrates an embodiment where the total number of strobe lines in the display system is reduced from a 1:1 strobe line to memory cell ratio by increasing the number of memory cells connected to individual strobe lines. In particular, FIG. 6 illustrates an embodiment where each strobe line corresponding to a color and is connected to a plurality of cells of the respective color so that each STROBE signal controls a plurality of cells of the respective color. The figure depicts four display circuits 600, 602, 604, 606 with three SRAM cells per display circuit. Each display circuit 600 has a RED CELL 608, a GREEN CELL 610, and a BLUE CELL 612. The four RED CELLS (608A–D) are connected to a single RED STROBE 614 by connection 614A the four GREEN CELLS (610A–D) are connected to one GREEN STROBE 616 by connection 616A, and the four BLUE CELLS (612A–D) are connected to one BLUE STROBE 618 by connection 618A. When the RED STROBE signal is activated, the voltages stored in the four RED CELLS connected to the RED STROBE are transferred to their respective pixels. The GREEN STROBE and BLUE STROBE signals operate analogously.

As can be seen from FIG. 6, it is possible to reduce the number of strobe lines in a display system from a 1:1 strobe line to memory cell ratio by having multiple memory cells be controlled by a single strobe line. It should be understood that depending on the application, it may be desirable to increase the number of strobe lines in order to minimize power consumption at the expense of display thickness or decrease the number of strobe lines in order to reduce the thickness of the display at the expense of power consumption.

The display matrix of the present invention can be designed to be employed in a wide variety of electronic devices in which a real or virtual image needs to be displayed. In particular, the display matrix is intended for use in small sized electronic devices such as portable computers, personal communicators, personal digital assistants, modems, pagers, video and camera viewfinders, mobile phones, television monitors and other hand held devices.

In one particular embodiment, the display matrix is employed in a virtual image display system where the display matrix forms a source object which is then magnified by one or more magnification optics. In this embodiment, the display matrix is preferably sized to be a microdisplay.

Figure 7A:
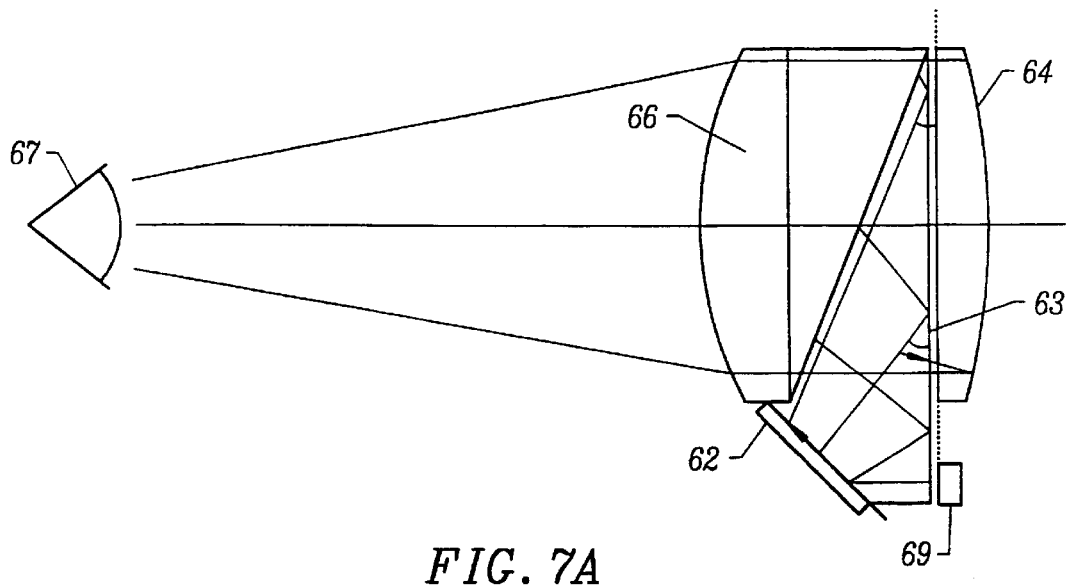
FIGS. 7A–7C illustrate three examples of a virtual image display which include a display matrix according to the present invention, and one or more magnification optics.
Figure 7B:
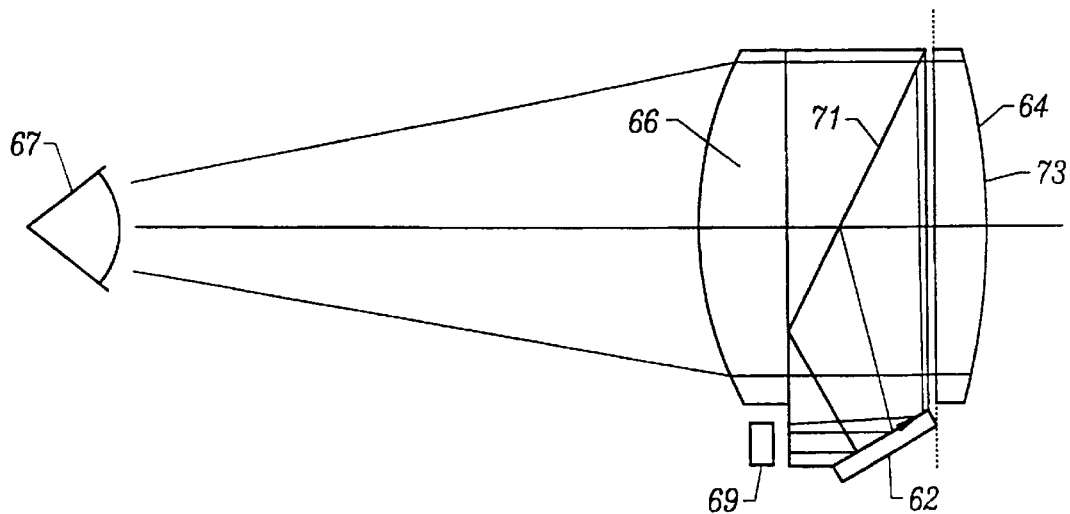
Figure 7C:
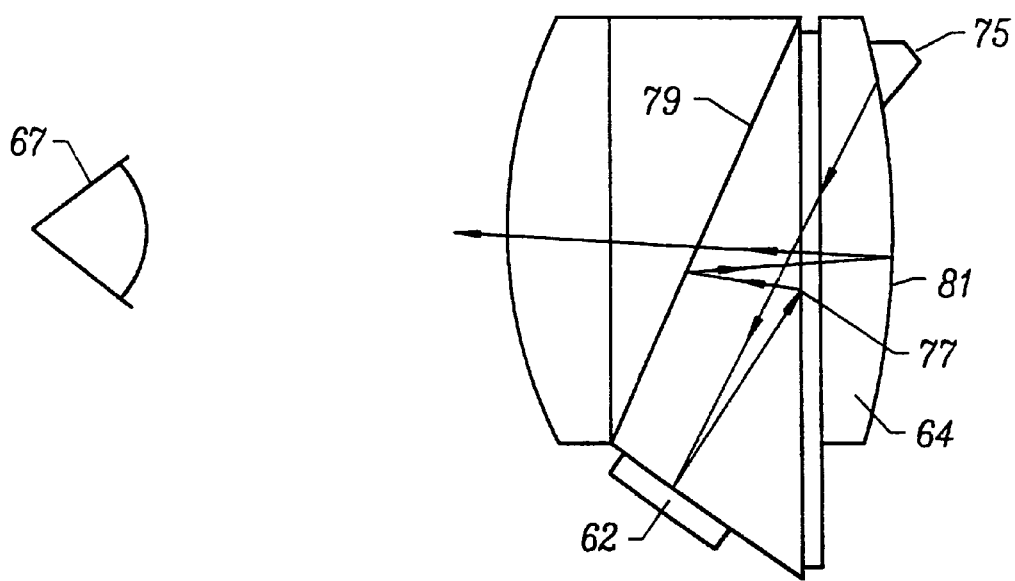

FIGS. 7A–7C illustrate three examples of a virtual image display which include a display matrix according to the present invention, and one or more magnification optics.

FIG. 7A illustrates a virtual image display system which includes a display matrix 62 which projects an image onto a back surface 63 of the first magnification optic 64 which reflects (at least partially by total internal reflection) the image to a surface 65 having a magnification function and a reflection function. The surface 65 reflects the image to a second magnification optic 66 and to an observer 67.

FIG. 7B illustrates a virtual image display system which includes an illumination source 69 reflects light off the microdisplay system 62 to a beamsplitter 71 which reflects an image formed by the microdisplay to a surface 73 of the first magnification optic 64 having a magnification function and a reflection function. The surface 73 reflects the image through the beamsplitter 71 to a second magnification optic 66 and to an observer 67.

FIG. 7C illustrates a virtual image display system which includes an illumination source 75 which reflects light off the microdisplay system 62 to a back surface 77 of a first magnification optic 64 which reflects the light to a beamsplitter 79 which reflects the light to a surface 81 of the first magnification optic 64 having a magnification function and a reflection function. The surface 81 reflects the light through the beamsplitter 79 to a second magnification optic 66 and to an observer 67. Examples of virtual image display systems which can be used include but are not limited to the virtual image display systems described in U.S. Pat. Nos.: 5,625,372; 5,644,323; and 5,684,497 which are each incorporated herein in their entirety by reference.

Figure 8A:
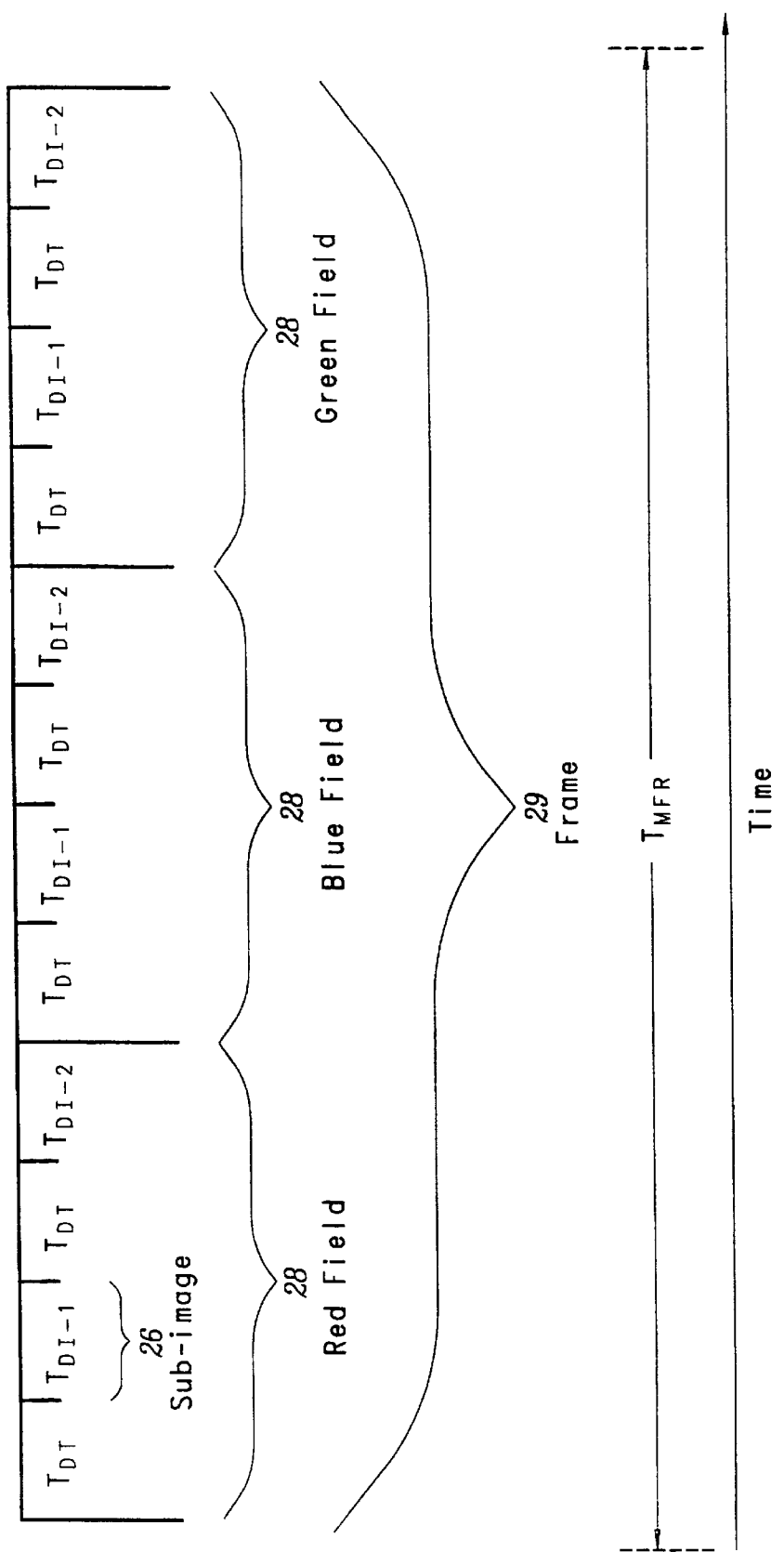
FIG. 8A illustrates the data transfer and display sequence of a prior art display matrix which employs a single memory cell per pixel.
Figure 8B:
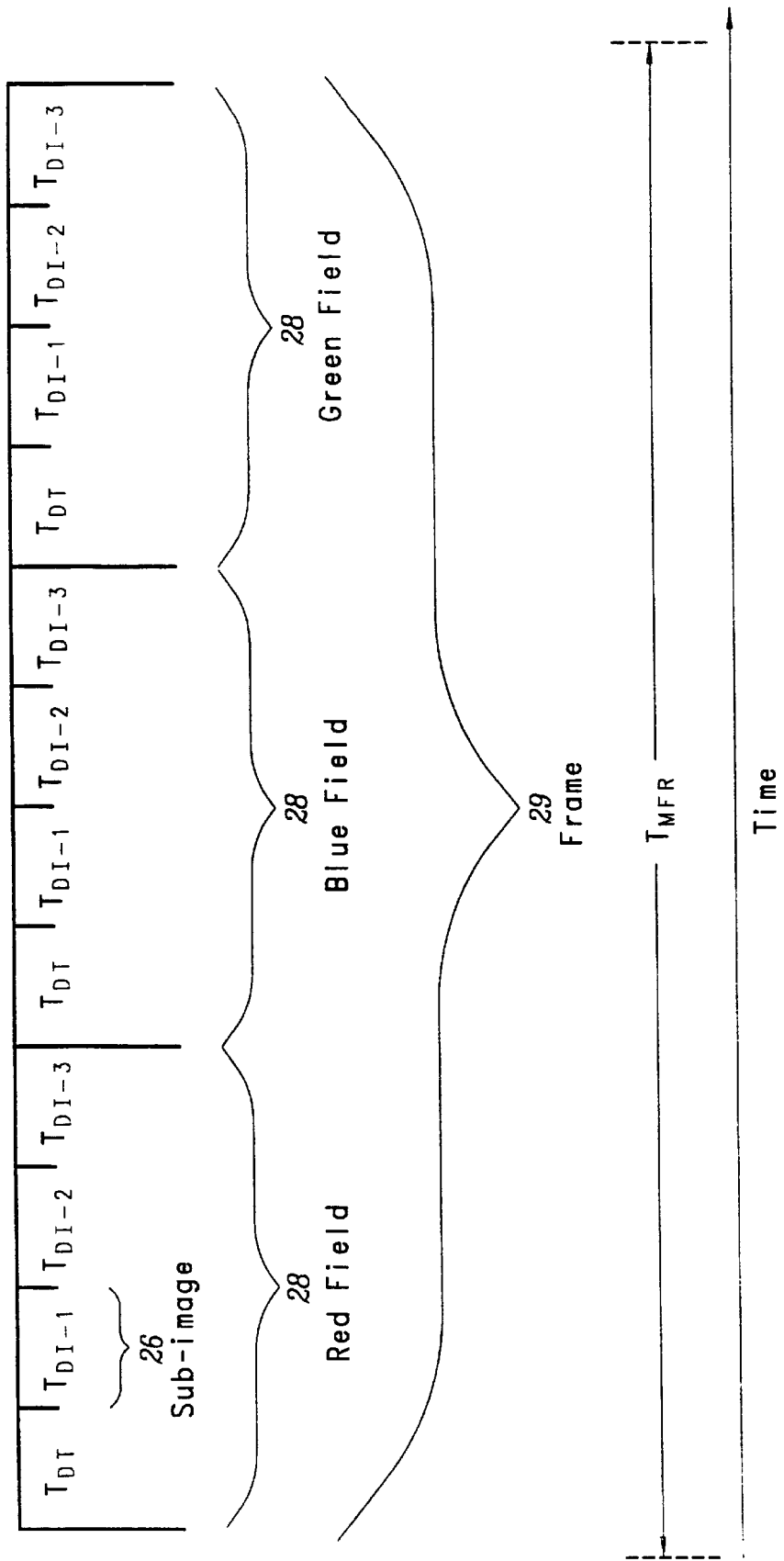
FIGS. 8B and 8C illustrate data transfer and display sequences that may be used when a display matrix according to the present invention which employs two or more memory cells per pixel is operated in an FSC mode.

One feature of the present invention is the efficiency with which the display matrices of the present invention may be operated in a field sequential color (FSC) mode. In a typical FSC mode, a composite image is formed through the repetition of a sequence of different color sub-images, typically red, green, and blue sub-images. As illustrated in FIGS. 8A and 8B, the one or more sub-images 26 corresponding to a color is called a field 28. A single sequence of the different fields is called a frame 29.

Sub-image data generally differs by field 28 in an FSC system. In the special case where the data is identical across the red, green, and blue fields, the composite image appears monochrome with gray levels.

Data transfer requirements for an FSC mode are more stringent than for a general system for sequentially formed composite images. The total length of time that a sub-image may be displayed, from the end of the display of the prior sub-image to the end of the display of the current sub-image, is limited by the minimum frame rate necessary to avoid flicker. The data for a particular sub-image must also be present in the display matrix from the beginning to the end of the sub-image. The quality of the image produced is reduced if part of the one color frame is displayed while a part of another color frame is displayed.

FIG. 8A illustrates the data transfer and display sequence of a prior art display matrix which employs a single memory cell per pixel. As illustrated, the entire data transfer for a sub-image takes place during a time period $T_{DT}$ after the time period for displaying the prior sub-image $T_{DI-1}$ and before the time period for displaying the current sub-image, also $T_{DI-2}$. In order to avoid flicker, the period of time available for data transfer and display is limited by the minimum frame rate $T_{MFR}$. The need to transfer the entire data for a sub-image during the time period $T_{DT}$ which is less than the minimum frame rate $T_{MFR}$ time period creates a high instantaneous bandwidth requirement on a prior art display matrix operating in an FSC mode. The average bandwidth requirement, which is a direct function of the frame rate as well, is accordingly high.

Figure 8C:
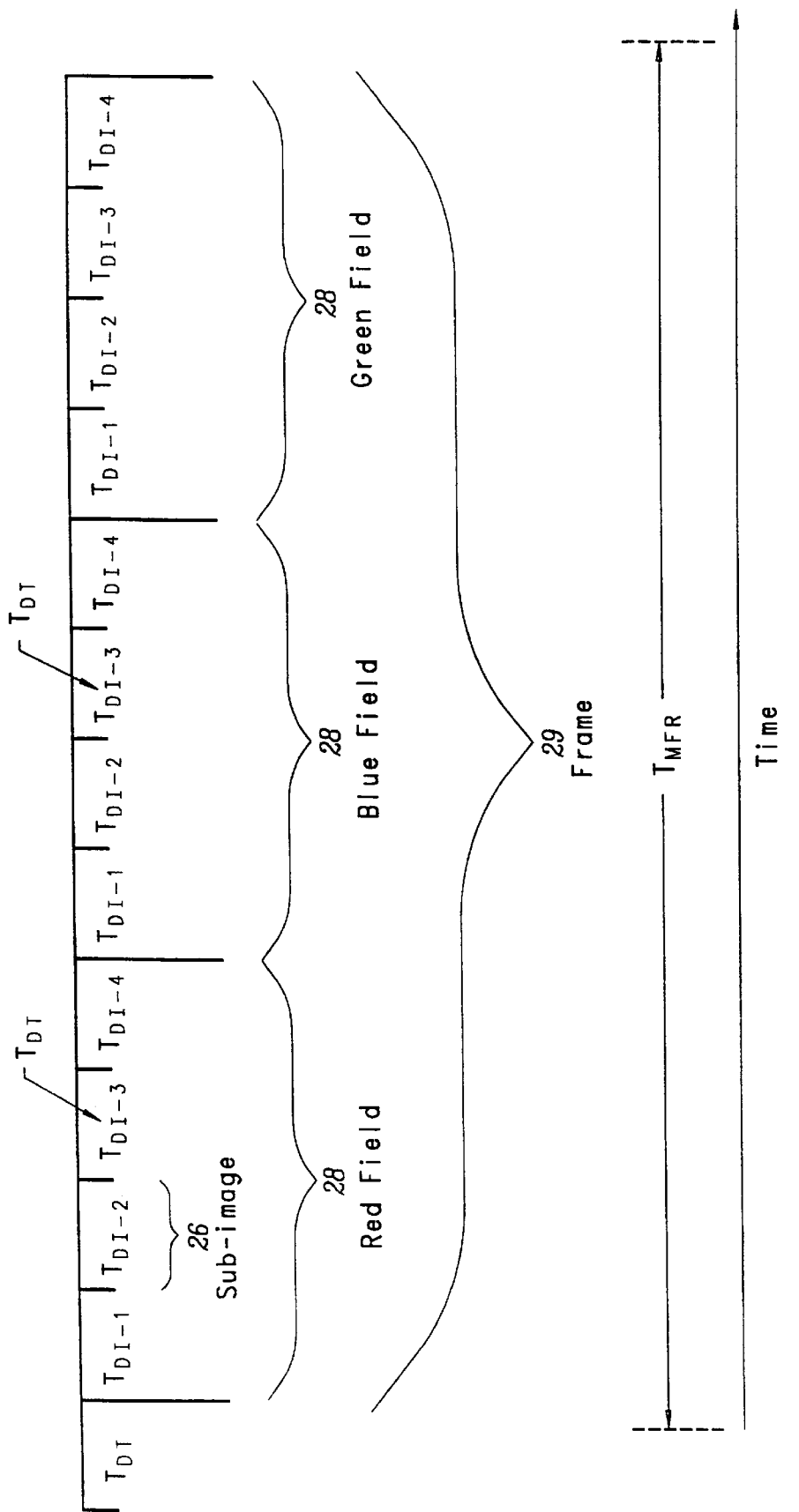

FIGS. 8B and 8C illustrate data transfer and display sequences that may be used when a display matrix according to the present invention which employs two or more memory cells per pixel is operated in an FSC mode. When a display matrix employs two or more memory cells per pixel, it is possible to store data for more than one sub-image, whether of the same or a different field. In one embodiment, the display matrix includes sufficient data to store all of the individual sub-images of a field or the entire composite image simultaneously.

As illustrated in FIG. 8B, by having sufficient memory to store multiple sub-images, it is possible to display multiple sub-images of a field, optionally all the sub-images of a field, without having to transfer any data into memory. Alternatively, as illustrated in FIG. 8C, by having sufficient memory to store multiple sub-images, it is possible to display one sub-image while transferring data for another sub-image into memory. As discussed herein, the ability to display one sub-image while transferring data for another sub-image into memory enables one to produce more colors and other visual effects than would otherwise be possible due to the greater instantaneous bandwidth requirement of prior art display matrices operated in an FSC mode.

As demonstrated by the data transfer and display sequences illustrated in FIGS. 8B and 8C, the use of two or more memory cells per pixel in a display matrix significantly reduces the instantaneous bandwidth requirement of the system. In addition, in the case where the data for one particular field sub-image is the same as the that for the next sub-image of the same field, the data for the next sub-image does not need to be transferred at all, reducing the average bandwidth requirement.

The present invention is intended to encompass display matrices where each memory cell consists of one bit or more than one bit of memory. As used herein, a digital display system refers to a display system where a single binary bit of memory is associated with each memory cell. In this system, the selector outputs a binary value as a function of the data stored in the memory cells, and binary control signals are provided to each display circuit. By binary is meant a two-level voltage system, where each voltage can be represented by either a '0' or a '1'.

In a digital display system, gray levels within a particular color field may be attained by multiplexing different sub-images of that field. By showing certain sub-images of a field longer than other sub-images, certain sub-images are rendered more significant to the composite field image than other sub-images. For instance, in a display matrix with two memory cells per display circuit, the first memory cell in each display circuit may correspond to the most significant bit (MSB) of the binary representation of the grayscale values for a particular field. The second memory cell in each display circuit may correspond to the least significant bit (LSB). In a display matrix with three memory cells per display circuit, the first memory cell may be the most significant bit (MSB), the second memory cell the second significant bit (SSB), and the third memory cell the least significant bit (LSB).

Figure 9A:
FIG. 9A illustrates a time line for displaying one bit plane for a larger portion of the time that a particular frame is displayed by displaying that bit plane longer than other bit planes.
Figure 9B:
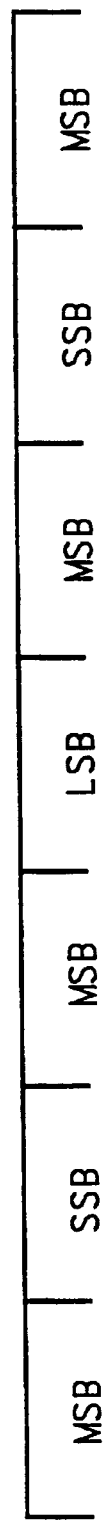
FIG. 9B illustrates a time line for displaying one bit plane for a larger portion of the time that a particular frame is displayed by displaying that bit plane more frequently than other bit planes.

By displaying each bit for different portions of the time that a particular frame is displayed, a multiple grayscale field may be formed. One bit may be displayed for a larger portion of the time that a particular frame is displayed either by displaying that bit longer, as illustrated in FIG. 9A, or by displaying that bit more frequently, as illustrated in FIG. 9B. For example, a four-level grayscale system is achieved in a two bit system when the MSB sub-image is displayed for twice as long as the LSB sub-image. The total display time for both sub-images equals the display time for the field.

Generalizing the concept of temporally multiplexing binary sub-images, the number of gray levels possible is equal to $2^N$, when N is the number of sub-images. One particular sub-image corresponds to the MSB of the binary representation of the gray level; another to the LSB. Sub-images corresponding to the $2^{nd}$ ($2^{nd}$ SB), $3^{rd}$ ($3^{rd}$ SB), and further significant bits of the binary representation are possible for systems of more than two sub-images. The total duration of one sub-image is proportional to $½^M$, where M is the significance of the bit corresponding to the sub-image. The total duration for one sub-image may be continuous or broken into smaller time slices for interleaving with other sub-images.

The total number of perceived colors possible in a system is the product of the number of gray levels for each constituent color field. For example, 64 colors may be generated by a three color system where each color has a four degree gray level (4×4×4).

In one embodiment of the present invention, two memory cells are present in each display circuit. Once data has been loaded into the display matrix, it is possible to form either a dichromic composite static image or a four-level grayscale monochromic composite static image. In the dichromic case, one memory cell of each display circuit contains the data corresponding to one color field and to the location of the display circuit within the image. The second memory cell contains the corresponding data for the second field. By cycling between the two sub-images corresponding to the memory cells within each display element, a dichromic composite static image is formed.

In the four-level grayscale case, the memory cells of each display circuit contain the MSB and LSB of the image data associated with a single color field. By cycling between the two corresponding sub-images, while keeping the total duration of the MSB image twice that of the LSB image, four levels of grayscale are achievable.

It is noted that in both the dichromic and four-level grayscale cases, if the image is static, there is no need to load data into memory more than once. A display system of the present invention just continues cycling between the two sub-images to achieve the intended effect. Data is only reloaded when the image content changes. In contrast, in a prior art display system with only a single binary memory element in each display circuit, data would have to be loaded in with every sub-image, for both the dichromic and four-level grayscale cases, regardless of whether the image content had changed. Even if the sole memory element were analog, data would still have to be loaded in with every sub-image for the dichromic case.

In analogy with the two cell case, with three memory cells present in the display circuit, a three-color composite image and an eight-level grayscale monochromic composite image are possible with data reloading not necessary until the image content changes. With four memory cells, three basic cases are possible: (1) a four-color composite image; (2) a dichromic composite image with four levels of grayscale in each color; and (3) a 16-level grayscale monochromic composite image.

In analyzing display circuits with more than four memory cells, many permutations of numbers of color fields and grayscale levels are possible and are all intended to fall within the scope of the present invention. If the analysis is confined to typical display systems operating in an FSC mode with three fields, some of the interesting display circuits are those with (1) six memory cells for four levels of grayscale per field; (2) nine memory cells for eight levels of grayscale per field; (3) twelve memory cells for 16 levels of grayscale per field; and (4) eighteen memory cells for 64 levels of grayscale per field.

In general, each memory cell in a display circuit of the present invention corresponds to a sub-image. The sub-images corresponding to different memory cells are output from the display matrix according to the control signals provided to each display circuit. The sub-images can have any order and may be displayed for any amount of time. For example, a particular sub-image may be displayed more frequently than other sub-images, as in the case of the MSB sub-image. The sub-image may also be displayed for a longer period of time than other sub-images.

The assignment of sub-images to different memory cells may be dynamic. In a system with three bits of memory for display element, the assignment of the first, second, and third memory cells as the MSB, SSB, or LSB can be changed, field to field and/or frame to frame. For example, the first memory cell of every display element may at one time be assigned to the MSB sub-image of the red field and at another time to the LSB sub-image of the green field.

In display systems for sequentially formed composite images, the display image data is transferred to the display matrix from a frame buffer. The frame buffer is typically external to the display system in the sense that the frame buffer is a separate component from the display matrix.

The purpose of an external frame buffer is to house an entire frame of data and act as an intermediary between some sort of processor, which initializes and modifies the image in the frame buffer, and the display matrix, which displays the image or part thereof. The data transfer bandwidth between the processor and the frame buffer varies according to the rate of change in the content of the image. For example, a static, monochromic image requires essentially zero bandwidth. In a display system operating in an FSC mode with a high frame rate, the bandwidth requirement remains high regardless of how static the image may be.

A display matrix of the present invention can also be used to store multiple sub-images, for example all the sub-images of a single color field as opposed to an entire frame. For example, with three memory cells in each display element, the memory cells can be assigned to the MSB, SSB, and LSB sub-images of a color field, for a total number of $2^3=8$ shades of gray. If the memory cells are then reassigned to corresponding sub-images of the next color field during the display of the next color field, then 8 levels of grayscale will be possible for the next color field as well. For an entire frame, a total of $8^3=512$ colors are possible.

Using a display matrix of the present invention operated in an FSC mode, it is possible to house an entire frame of data in the display matrix itself. For example, a three color FSC system may be built from a display matrix having three memory cells in each display element. Each memory cell would be dedicated to a different color field sub-image. Since there would only be one bit per field, the total number of colors possible in the system would be $2^3=8$. With six memory cells in each display element, $4^3=64$ colors would be possible.

The advantage of housing an entire frame of data within the display matrix is that the external frame buffer may be completely eliminated from the display system, saving not only a component but also a great deal of bandwidth. Only the bandwidth between the processor and the display matrix would remain. In contrast, operating a prior art display matrix in FSC mode, there is no room within the display matrix to house multiple sub-images simultaneously, necessitating an external frame buffer.

One condition for eliminating the external frame buffer is that the display matrix behave like an external frame buffer from the processor point of view. In particular, the display matrix should behave like a memory: random access addressable as well as readable and writable. In contrast, the display matrix of prior art typically is not random access addressable and is only writable.

The primary interface to the display matrix from the source of image data can mimic that of a synchronous SRAM. For example, the clocked interface includes a general backplane IC chip select and a read/write signal. An internal write buffer supports consecutive writes to the memory cells in the display matrix and to programmable registers outside the display matrix. The latency to the first read data from either the memory cells or the programmable registers is a fixed number of cycles. Data on consecutive cycles is returned on burst reads. The length of burst accesses can be programmed to be 1, 2, 4, or 8 words, where the length of a word is defined as the data bus width. The latter is initialized to 8 bits on reset, but can be reprogrammed to 8, 16, or 32 bits. A total of 20 address lines can be used to specify the destination of a read or write to the memory matrix.

A secondary interface optimized for minimum pin count is also possible. The secondary interface can include a vertical synchronization signal, a horizontal synchronization signal, a data enable signal, and a clock, along with 8, 16, 24, 32, or some other intermediate number of bits of data. The secondary interface can be used to scan data into the display matrix only, with no capability to read data from the matrix.

A variety of actual sources of image data outside the display matrix may be used. For instance, read only memory (ROM), programmable memory such as a field programmable gate array (FPGA), an external frame buffer, or a processor are possible.

Layout Designs for Display Circuits

An aspect of the present invention relates to layout designs for positioning a plurality of display circuits adjacent pixels of a corresponding display element. For instance, in a display system of the present invention, there are multiple memory elements per pixel. As the number of memory elements per pixel increases, it becomes increasingly difficult to position the display circuit including the plurality of memory elements adjacent the pixel. It is thus necessary to design the layout of the display matrix to accomodate for display circuits which do not fit within the spatial confine, or "footprint", of the corresponding pixel.

One aspect of the present invention relates to a display matrix layout design where the display circuit is at least partially positioned outside of the footprint of the pixel. Another aspect of the present invention relates to a display matrix layout design where a display circuit is positioned within the footprint of two or more pixels. Yet another aspect of the present invention relates to a display matrix layout design where two or more display circuits are positioned within the footprint of a pixel. These layout designs allow multiple memory cells to be positioned more closely adjacent each pixel.

Figure 10:
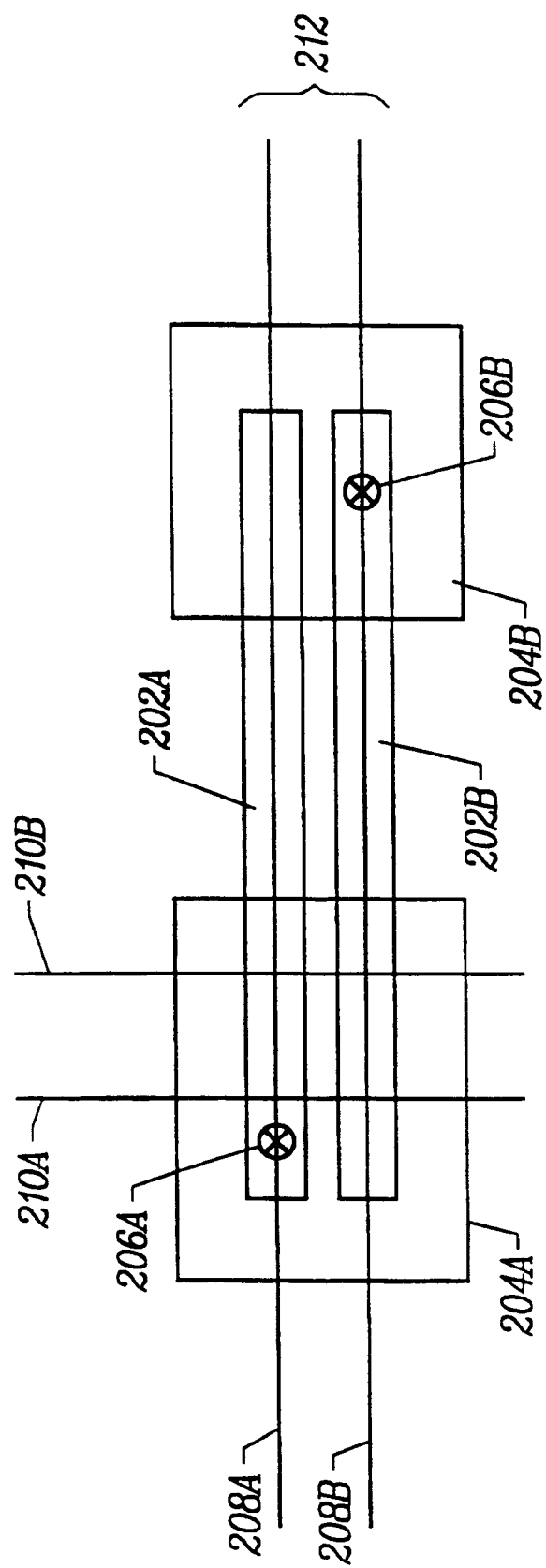
FIG. 10 illustrates a pair of display circuits and a pair of pixels, wherein the display circuits are partially within the footprints of each of the pixels, and the pixels are partially within the footprints of each of the display circuits.

The layout designs described above are illustrated in FIGS. 10–12. FIG. 10 illustrates two rectangular display circuits 202A, 202B placed under two pixels 204A, 204B. Each display circuit is at least partially located within the footprints of both pixels. Additionally, each pixel is placed within the footprints of both display circuits. However, each of the display circuits has an electrical connection to only one of the pixels 206A, 206B, thereby preserving the correspondence of one pixel to one display circuit in each display element.

Figure 11:
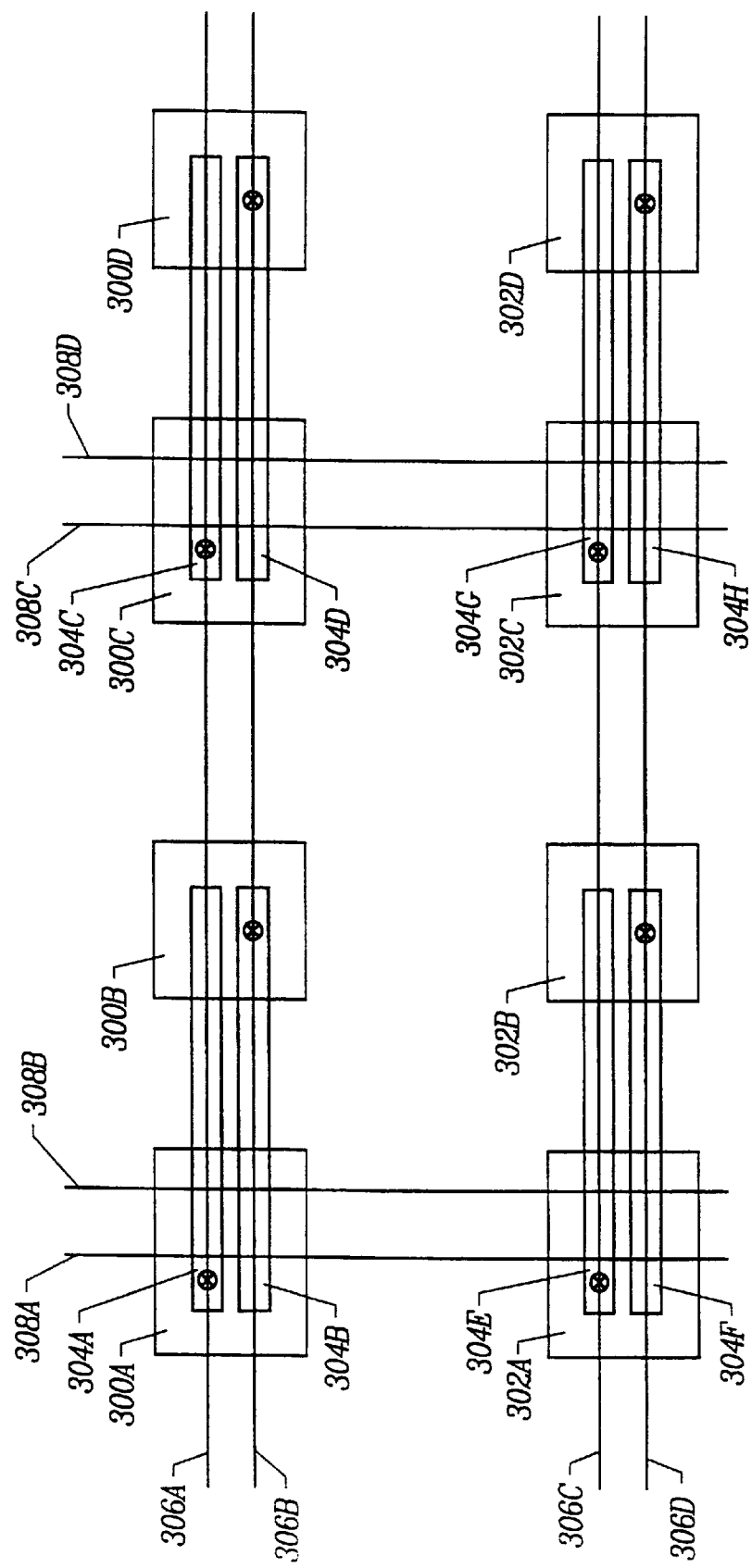
FIG. 11 illustrates a matrix of display circuits and pixels, wherein multiple data circuits overlap the footprints of multiple pixels, and data lines are connected to multiple display circuits.

One feature of the layout designs illustrated in FIGS. 10–12 is the positioning of multiple address lines under each pixel or under each row of pixels. In order to facilitate random access to the memory elements of each display circuit, each of the display circuits must be separately addressable. This requires each display circuit to be connected to an address line. When two or more display circuits are placed in the footprint of a pixel, the same number of address lines are placed under the pixel, one for each display circuit.

The positioning of multiple address lines under each pixel and under a row of pixels is illustrated in FIG. 10. Each of the display circuits 202A and 202B is connected to a single address line, 208A and 208B, respectively. But since both display circuits lie within the footprint of one pixel 204A, there are two address lines running under one row of pixels 212 in the display matrix.

The layout illustrated in FIGS. 10–12 were multiple display circuits are positioned within the footprint of a pixel provides a further advantage of enabling a substantial decrease in the number of data lines (e.g., bit and bit bar lines) used in the display system. By placing multiple display circuits within the footprint of an individual pixel, multiple data circuits can be connected to a single pair of bit and bit bar lines. The layout also results in an increase in the number of address lines that are used in the display system in order to preserve random access to the memory elements in the display system. However, the reduction in the number of data lines is more significant.

Each display circuit in the display matrix connects to a BIT line and a BIT BAR line. By placing multiple display circuits within the footprint of each pixel, each display circuit within the footprint of a pixel can be connected to the same BIT and BIT BAR lines. This allows for a net reduction in the number of BIT and BIT BAR lines connected entering the display system.

How the number of data lines can be reduced according to the present invention will now be illustrated with regard to FIGS. 10–12. In FIG. 10, display circuits 208A, 208B are both located under pixel 204A and pixel 204B. An address line is provided for each display circuit, shown in the figure as address lines 208A, 208B. Meanwhile, a single pair of data lines (BIT 210A and BIT BAR 210B) are used for both display circuits. As a result, only 4 data and address lines are employed. By contrast to FIG. 10, one could use a single address line for both display circuits and two data lines for each display circuit (not shown). This, however, would result in 5 data and address lines being used.

FIG. 11 illustrates another embodiment where there are two rows and four columns of pixels (300A, 300B, 300C, 300D and 302A, 302B, 302C, 302D). Each row of pixels is divided into two pairs with a pair of display circuits (304A–H) being positioned underneath the pair of pixels, as in FIG. 10. Two address lines (306A–D) are positioned under each row of pixels and a pair of data lines (308A–D) are provided for each two columns of pixels. As illustrated in FIG. 11, a total of 8 data and address lines are employed. By contrast, if BIT and BIT BAR lines were used for each column of pixels, and an address line were used for each row of pixels, 10 data and address lines would be employed.

FIG. 12 illustrates yet another embodiment where there are five display circuits (402A–E) and five address lines (404A–E) running under the display circuits. Meanwhile, a single set of data lines (406A–B) are used for the five display circuits. As can be seen, only 7 data and address lines are used. By contrast, if one were to use 1 address line and 5 pairs of data lines per row of pixels, a total of 11 data and address lines would be used. As can be seen from FIG. 12, the reduction in the number of data lines becomes more significant as the number of memory cells per display circuit increases.

The layout designs illustrated in FIGS. 10–12 provide a substantial reduction in the number of lines used in the display matrix. For example, suppose a display matrix consists of 600 rows and 800 columns of pixels where each display circuit includes 3 memory cells. Assume each display circuit is positioned within the footprint of each pixel. This results in a corresponding matrix of display circuits which are arranged into 600 rows and 800 columns. Each row of display circuits in such a layout would be connected to an address line, thus requiring 600 address lines. Each column of display circuit would be connected to 3 pairs of data lines, one pair per memory cell. Since there are 800 columns, there would need to be 4800 data lines. Combined, a total of 5400 lines are needed.

Now lets assume one lays out a display matrix consisting of 600 rows and 800 columns of pixels as illustrated in FIG. 11. Each row is connected to two address lines. For 600 rows there would be 1200 address lines. Meanwhile, only three pairs of data lines are used for every two columns. For 800 columns there would be 2400 data lines. Combined, a total of 3600 lines are needed.

In another example, suppose a display matrix consists of 600 rows and 800 columns of pixels where each display circuit includes 5 memory cells. Assume each display circuit is positioned within the footprint of each pixel. According to this layout design, there would be 600 address lines (1 address line per row) and 8000 data lines (800 columns×2 lines per memory cell×5 memory cells) for a total of 8600 lines.

Now lets assume that one lays out a display matrix consisting of 600 rows and 800 columns of pixels as illustrated in FIG. 12. Each row is connected to five address lines so 600 rows would require 3000 address lines. Meanwhile, only five pairs of data lines are used for every five columns. For 800 columns there would be 1600 data lines (800 columns×10 lines per 5 columns). Combined, a total of 4600 lines are needed. As can be seen, the reduction in the number of data lines becomes quite significant as the number of memory cells per display circuit increases.

Local Decoding of Addresses

An aspect of the present invention relates to the use of local decoding of row addresses in the display system to reduce the number of address lines, or "word lines," in the display system. According to this layout technique, decoders are inserted at periodic intervals in the display matrix. These decoders are connected to surrounding display circuits, so that each decoder is connected to rows of the display matrix. Each decoder receives a word line, two sub-word lines, and an enable line. The sub-word lines supply two bits, a Most Significant Bit (MSB) and a Least Significant Bit (LSB) which provide an offset for selecting one of the rows connected to the decoder. This obviates the need to connect an address line to each of the rows connected to the decoder. The enable bit is used to minimize power consumption.

FIG. 13 is a schematic illustration of local decoding. In this example, the local decoder 500 is connected to four rows of display circuits 502A, 502B, 502C, 502D in the display matrix. The rows of display circuits connected to the local decoder 500 are referred to herein as a cluster of display circuits. There are three lines entering the local decoder from above. Two of these are most significant bit MSB 504 and the least significant bit LSB 506, which decode which of the four rows connected to the decoder is being addressed. The third line entering the local decoder from above is an enable bit 504, intended to save power. The data lines serve as sub-address lines by controlling which display circuits are being operated by the local decoder.

The two data lines MSB and LSB provide an offset for selecting one of the rows connected to the decoder. Each value of the (MSB,LSB) pair connotes exactly one of the rows entering the decoder. For instance, "00" may denote the first row 502A, "01" the second row 502B, "10" the third row 502C, "11" the fourth row 502D.

The connection of the rows to the decoder, coupled with the offset provided to the local decoder, can be used to reduce the number of address lines connected to the rows of the display matrix. In particular, the number of address lines may be reduced by a factor equal to the number of values that can be denoted by the offset. To illustrate, consider FIG. 13. As there are four rows connected to the decoder, each of these four rows may be selected by one of the four values of the offset. Thus, to select one of these four rows, the display system needs only one word line connected to the decoder, and a pair of sub-word lines to select one of those four rows connected to the decoder. Thus, the number of address lines used in the display system can be reduced by a factor of four.

In the example of FIG. 13, the local decoders are placed after every 16 pixel columns. Thus, if there are 800 pixel columns in the display matrix, there are 800/16=50 decoders per row. As there are three lines entering each decoder, i.e., the sub-word lines MSB, LSB, and the enable bit, there are 50×3=150 additional lines entering the display matrix. However, if there are 600 rows, the number of address lines are reduced by a factor of four, to 150, resulting in 450 fewer address lines. Thus, the addition of the 150 offset and enable lines is countered by a decrease in 450 address lines.

The insertion of local decoders also confers benefits during fabrication of the display system, as it obviates the need to fabricate word lines in metal. The present embodiment eliminates the need for global word lines which span each row of display circuits, as global word lines are replaced with relatively short interconnects between decoders. The relative brevity of the interconnects allows them to be fabricated in poly-silicon rather than metal. The absence of metal word lines in the IC results in improved packing density, and frees space for other metal interconnects.

Reducing the Numbers of Word and Data Lines

The display circuit layout designs described above, for example with regard to FIGS. 10–12, can be combined with local decoding to produce a drastic reduction in the number of address and data lines entering the display matrix. As illustrated in regard to FIGS. 10–12, the number of data lines can be significantly reduced by connecting data lines to multiple data circuits. The resulting increase in address lines can then be diminished by replacing global word lines with local decoders.

The synthesis of these techniques can be illustrated by example. Consider a display matrix which consists of 600 rows by 800 columns and 3 memory elements per pixel. A display system with exactly one data circuit within the footprint of each pixel has 5400 total lines including 600 address lines and 4800 data lines [800×3 BIT lines and 800×3 BIT BAR lines]. By designing the display circuits so that two display circuits overlap each pixel (as in FIG. 11), the number of address lines is doubled to 1200, but the number of BIT and BIT BAR lines reduced to 2400, for a total of 3600 lines. If we then apply local decoding as shown in FIG. 13, the number of address lines is reduced by a factor of 4, reducing the number of address lines to 1200/4=300. Hence, by employing the layout and local decoding techniques described above, a grid of 600 address lines and 4800 data lines can be replaced by a grid of 300 address lines and 2400 data lines.

Modes of Operating the Display Matrix

Several different modes for operating a display matrix according to the present invention are possible. One mode, referred to herein as the "Power Miser Mode," relates to a mode where writing to the display matrix is minimized, there reducing the amount of energy consumed by the display matrix. Another mode of operation, referred to herein as the "Color Rich Mode," relates to a mode where data is written to memory cells forming one bit plane while memory cells of another bit plane are used to display an image in order increase the number of sub-images that can be used to form a composite image. By being able to increase the number of sub-images that can be used to form a composite image, a greater number of colors may be formed by the display matrix. Yet another mode of operation, referred to herein as the "Color Mixing Mode," involves operating a display matrix in a Power Miser Mode and Color Rich Mode at the same time.

While the Power Miser, Color Rich, and Color Mixing modes for operating a display matrix according to the present invention are provided below, it is noted that many additional modes of operating the display matrices can be employed.

1. Power Miser Mode

Figure 14:
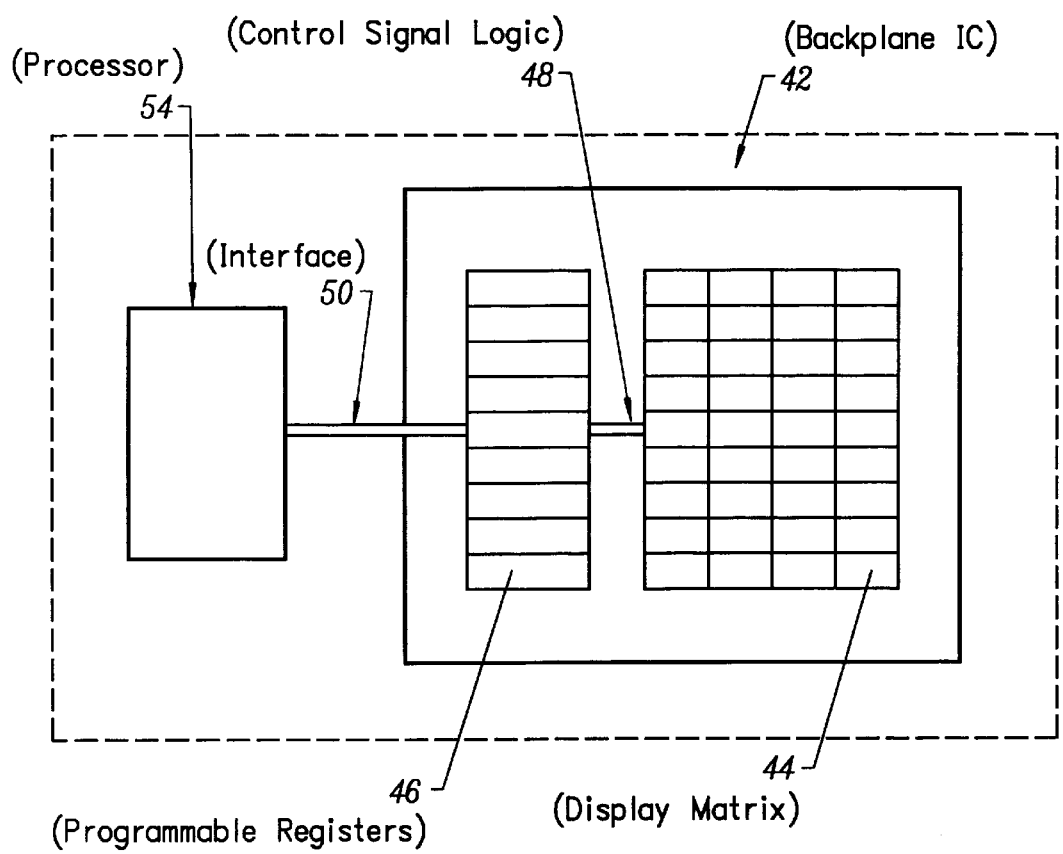
FIG. 14 illustrates a system in which a processor interfaces directly to the backplane IC.

One mode of operating a display matrix according to the present invention is illustrated in FIG. 14 in which a processor 54 interfaces directly with the display matrix (backplane IC) 42. This mode is referred to herein as power miser mode because the image is initialized and modified directly in the display matrix memory without the use and associated power consumption of an external frame buffer.

Because the backplane IC is fundamentally digital in nature, component and power consumption costs associated with digital-to-analog converters or other analog circuitry is avoided.

In operation, the backplane IC offers several functions in support of power miser mode. The synchronous SRAM interface on the chip coincides with the memory model assumed by typical processors. By using three memory cells per display circuit, the chip also offers capacity for a red, a green, and a blue bit plane, the minimum necessary for a display matrix to operate in an FSC mode. The chip can also be programmed for FSC control, a sequence such as the following:

Turn off all illumination and select the red data plane with the RED STROBE.

After pausing for LCD alignment, turn on the red LED.

Turn off the red LED and select the green data plane with the GREEN STROBE.

After pausing for LCD alignment, turn on the green LED.

Turn off the green LED and select the blue data plane with the BLUE STROBE.

After pausing for LCD alignment, turn on the blue LED.

In an eight-level grayscale monochrome implementation of power miser mode, the RED, GREEN, and BLUE cells of each display circuit are filled with the MSB, SSB, and the LSB of the corresponding image data. The three bit planes can be strobed in a variety of time modulation schemes to achieve the eight levels of grayscale in the color of the single illumination source. One possibility is to strobe the bit planes in RMS fashion using distributed binary coding as described later.

An additional function unique to power miser mode is on-chip support for scrolling. Scrolling in the present invention consists of shifting a scroll region horizontally or vertically by a pixel. The contents of a scroll buffer are used to fill in the area vacated by the shift. The scroll region can be an entire bit plane or portion thereof.

Figure 15A:
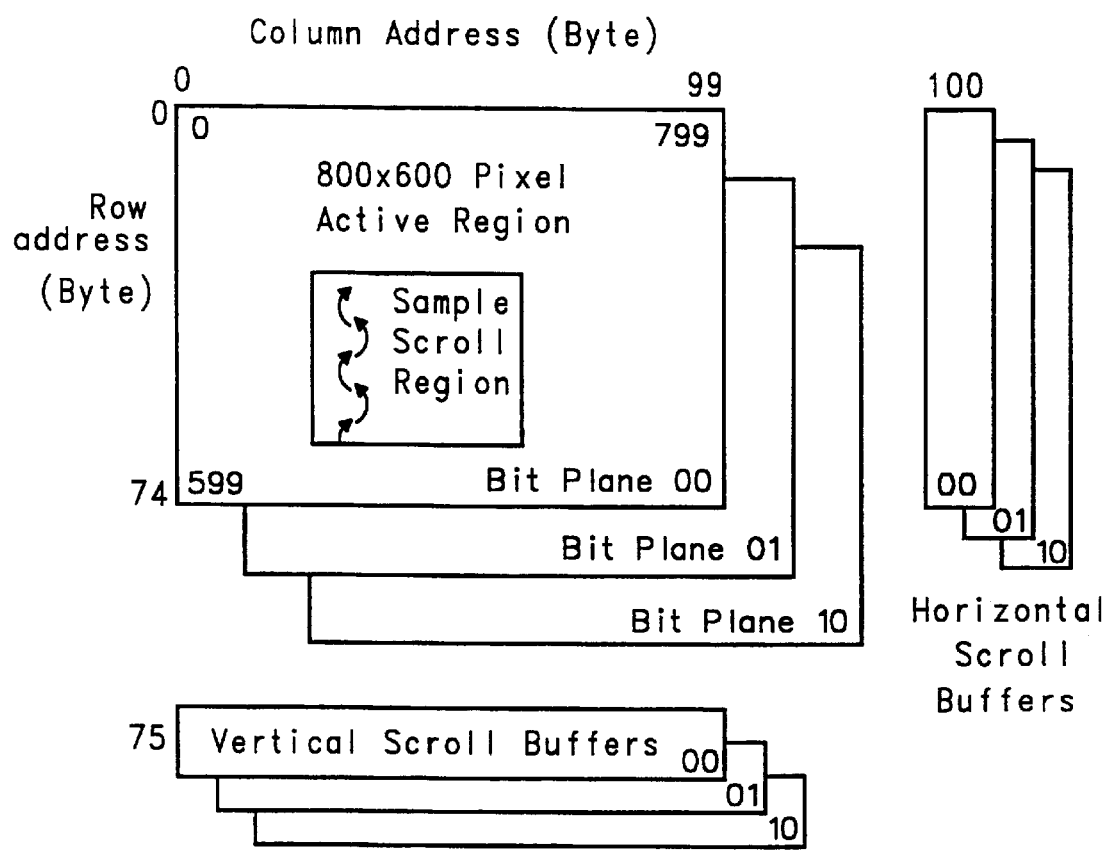
FIG. 15A illustrates an address map including scroll buffers.

FIG. 15A illustrates an address map including scroll buffers. The address bus illustrated in the figure is 20 bits wide. Bits $A_6$ through $A_0$ specify the column address of a byte, $A_{16}$ through $A_7$ its row address, and $A_{18}$ through $A_{17}$ its bit plane address. This address scheme assumes the three SRAM cells in each display element have been configured for separate address (WORD) signals. The address space of the display matrix encompasses 0–99 in the column address, 0–599 in the row address, and 0–2 in the bit plane address. Bit $A_{19}$ is the programming bit.

Buffers outside the active region are allocated for scrolling. The address space of a horizontal scroll buffer encompasses 100 in the column address and 0–599 in the row address. There are three horizontal scroll buffers, each differentiated by its bit plane address. The address space of a vertical scroll buffer encompasses 0–99 in the column address and 600–607 in the row address. There are three vertical scroll buffers, each differentiated by its bit plane address.

A scroll procedure may comprise the following steps:

The scroll buffer for a particular direction and bit plane is modified through processor reads and writes to its address space.

The scroll region programming registers are modified as necessary. The scroll command is issued by writing to the appropriate register. The backplane IC begins scrolling.

When scrolling is complete, the readyN pin is asserted back to the system so that another processor access can commence.

The scroll region is the area over which data will be shifted. The scroll region is defined by the coordinates of its upper left ($X_{UL}$, $Y_{UL}$) and lower right ($X_{LR}$, $Y_{LR}$) corners. The coordinates in the present invention are specified with byte granularity, so that the possible values are 0–99 in the X-direction and 0–74 in the Y-direction. Values greater than 99 in the X-direction and 74 in the Y-direction are prohibited. Data outside the scroll region will not be affected by the scrolling operation.

Figures 2, 15B:
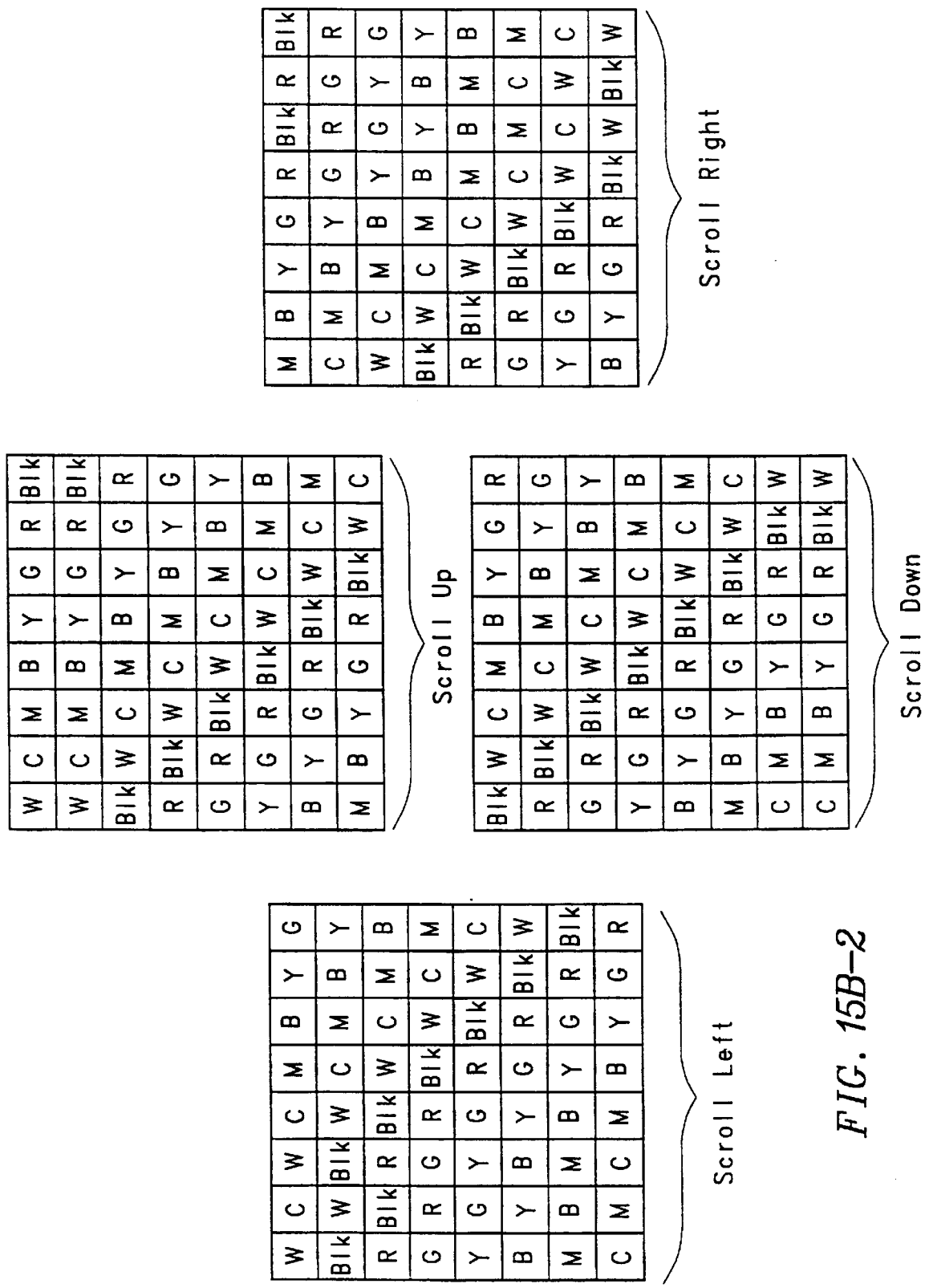
FIG. 15B illustrates an address map which can scroll pixel by pixel.

A second embodiment of scrolling is illustrated in FIG. 15B. A scroll region is first defined. In FIG. 15B the region is eight pixels high by eight pixels wide. However, it can be any region within the display matrix on a one-pixel boundary in the vertical direction and a two pixel-boundary in the horizontal direction.

The scrolling operation can move the contents of the scroll region up or down by one pixel or left or right by two pixels without affecting any of the data outside of the scroll region. Within the scrolling region, one row of pixels is always left unchanged by vertical scrolling and two columns of pixels by horizontal scrolling. These unchanged pixels must be overwritten by the new information from the external system to complete the scroll.

Scrolling is an example of hardware assistance for a graphical operation that is outside the operation of display matrices of prior art. By subsuming the external frame buffer within the display matrix of the present invention in power miser mode, a wide variety of hardware assistance functions for image modification become possible and useful within the display matrix.

2. Color Rich Mode

Figure 16:
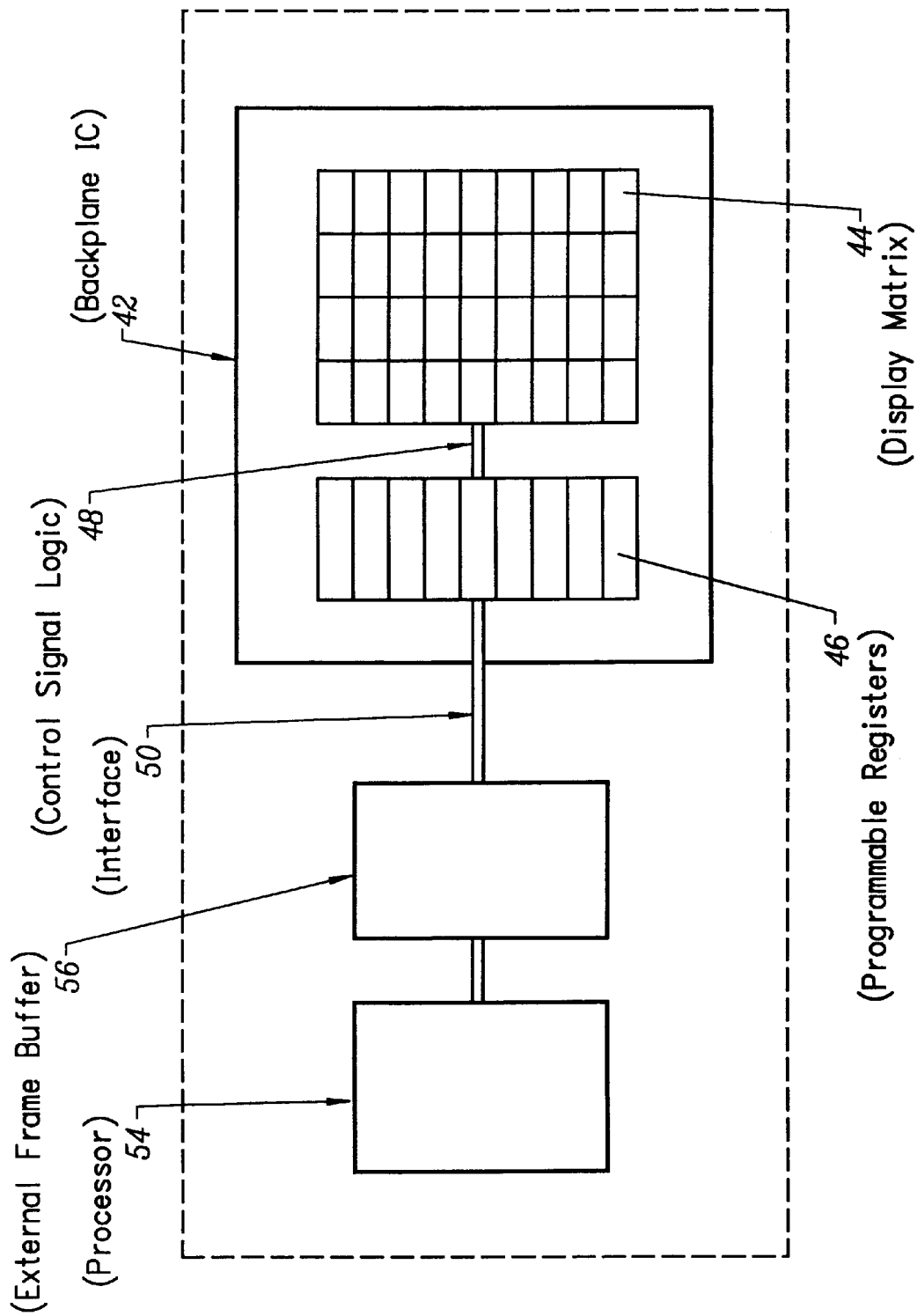
FIG. 16 illustrates a system in which an external frame buffer is placed between the processor and the backplane IC.

A second mode of operating a display matrix according to the present invention is illustrated in FIG. 16, in which an external frame buffer 56 is placed between the processor 54 and the display matrix (backplane IC) 42. This mode is referred to herein as color rich mode, because the multiple bit planes in the display matrix are used to generate multiple levels of grayscale in each of the color fields. For example, when three bit planes are used, eight levels of grayscale ($2^3$) are produced in each of three color fields for a total of 512 colors ($8^3$) in FSC operation.

An exemplary sequence for performing color rich mode in FSC operation is as follows:

Turn off all illumination.

Transfer the MSB, $2^{nd}$ SB, and LSB bit planes of the red image into the RED, GREEN, and BLUE memory planes of the display matrix.

Strobe the bit planes in RMS fashion using distributed binary coding as described below.

Turn on the RED LED.

Strobe the bit planes again in the same way.

Turn off the RED LED.

Transfer the MSB, $2^{nd}$ SB, and LSB bit planes of the green image into the BLUE, GREEN, and RED planes of the display matrix.

Strobe the bit planes.

Turn on the GREEN LED.

Strobe the bit planes.

Turn off the GREEN LED.

Transfer the MSB, $2^{nd}$ SB, and LSB bit planes of the blue image into the RED, GREEN, and BLUE planes of the display matrix.

Strobe the bit planes.

Turn on the BLUE LED.

Strobe the bit planes.

Figure 17:
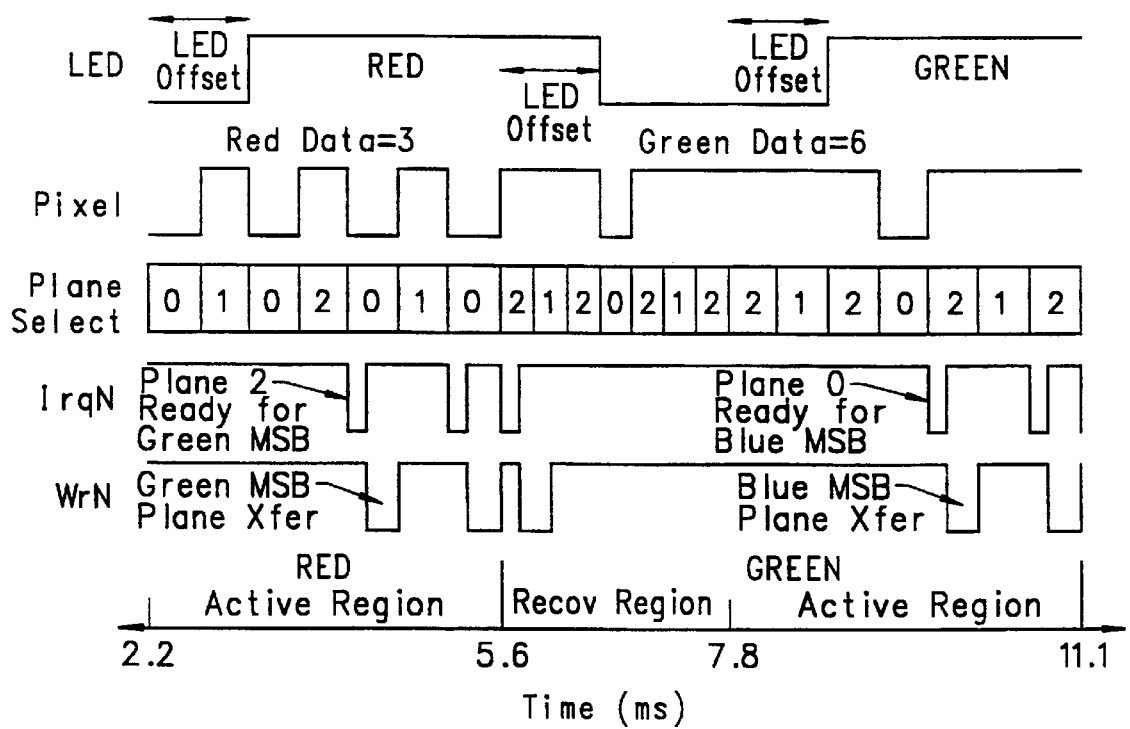
FIG. 17 illustrates part of a color rich mode sequence.

FIG. 17 illustrates part of the above sequence. The numbers 0, 1, and 2 are used to represent the RED, GREEN, and BLUE bit planes, respectively. Each color field in the figure has been divided into a RECOVERY and an ACTIVE period. The length of the ACTIVE period equals the length of time that the LED's are turned on. A detail contained in the figure though omitted in the above sequence is that the turn on time for an LED may be delayed from the start of the ACTIVE period. The ACTIVE and RECOVERY periods may have different length. The sum of their lengths is determined by the length of a field, which is typically one-third the length of the frame. The strobing of the bit planes both before and after an LED is turned on in the above sequence corresponds to strobing in the RECOVERY and ACTIVE periods in the figure. It has been found through experiment, that during the RECOVERY period, strobing the correct value for the color field is better than driving a constant binary '1' or '0' on the pixel.

Gray levels in a particular color field are produced by multiplexing sub-images temporally at a very fast rate. In the terminology of color rich mode, the sub-images correspond to bit planes and multiplexing is the same as strobing. When the time for a particular LCD to relax or align in response to a new electric field is greater than the duration of a sub-image, Root Mean Squared (RMS) voltage techniques can be employed.

Various strobing algorithms are possible to achieve a certain gray level. For instance, in a 3 bit-plane system, a conventional coding scheme might divide up an interval, such as the RECOVERY or ACTIVE period, into seven equal parts, and assign the MSB plane to the first four parts, the SSB plane to the next two parts, and the LSB plane to the last part. Then a gray level 4 would be achieved by a 1111000 sequence, a 5 by a 1111001 sequence, etc.

Figure 18:
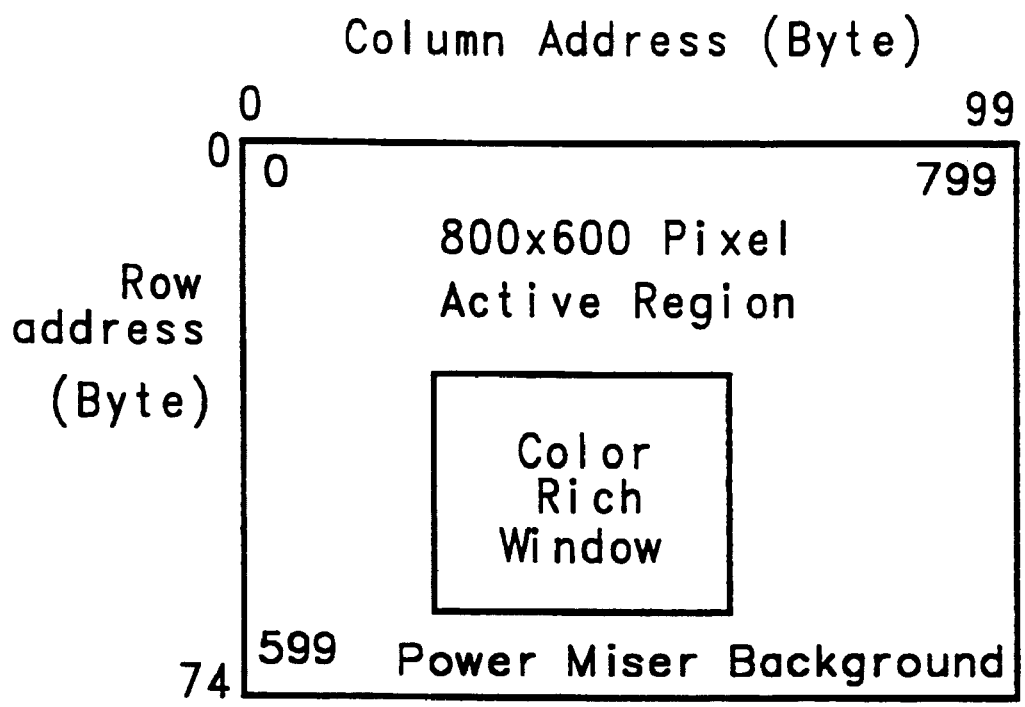
FIG. 18 illustrates a color mixing mode.

One algorithm that has been found empirically to have a better RMS effect than the above conventional coding scheme for a particular LCD is called distributed binary coding. A better RMS effect refers to the gradation in voltages driven on the liquid crystal being more uniform. The strobing formula for distributed binary coding is {MSB, SSB, MSB, LSB, MSB, SSB, MSB}. For example, 0={0000000}, 1={0001000}, 2={0100010}, 3={0101010}, 4={1010101}, 5={1011101},. 6={1110111}, and 7={1111111}. In FIG. 18, distributed binary coding is used to display a grayscale 3 in the red field followed by a 6 in the green field.

While the above formula relates to the present invention with three bit planes, distributed binary coding can be extended to display matrices of any number N of bit planes. The interval is first always divided into ($2^N-1$) time slots. The MSB plane time slots are determined first. The MSB plane is always placed in the first time slot and every other time slot there after. The $2^{nd}$ SB plane time slots is calculated next. The SSB plane is placed in the first available time slot and every fourth time slot thereafter. The $3^{rd}$ SB occupies the next available time slot and every eighth slot thereafter, and so on until the LSB ($N^{th}$) plane is place in the middle time slot. For instance, for four bit planes, the formula is {MSB, $2^{nd}$ SB, MSB, $3^{rd}$ SB, MSB, $2^{nd}$ SB, MSB, LSB, MSB, $3^{rd}$ SB, MSB, $2^{nd}$ SB, MSB}.

The ability of the display system of the present invention to perform distributed binary coding is a strong example of one of the advantages that the display circuit of the present invention provides. The grayscale level is strobed twice in one color field, once in the RECOVERY period and once in the ACTIVE period, for a total of 14 time slots. In a system with only one memory cell per display circuit, fourteen bit planes would have to be loaded in in order to strobe during 14 different time slots. This would require a very high bandwidth transfer rate and pixel refresh rate. However, by using a display matrix capable of storing three different bit planes, different bit planes need not be continuously written into a display matrix. This allows strobing the transition between strobing different bit planes to be significantly reduced, thereby making it possible to have 14 time slots.

According to the present invention, it is possible to alternate the assignment of MSB memory matrices for consecutive color fields. This enables the display matrix to further take advantage of having more than one memory cell in each display circuit. For instance, in the above sequence, the {RED, GREEN, BLUE} memory matrices were assigned to {MSB, SSB, LSB} for the RED field, while in the ensuing GREEN field, the assignments were switched to {LSB, SSB, MSB}. This algorithm is driven by the nature of distributed binary coding, in which the LSB plane always falls in the middle time slot while the MSB plane is always at the beginning. Once the LSB plane for the ACTIVE period of the RED field has completed, the memory plane can be used for the first plane needed by the GREEN field, which is the MSB plane. Hence, by modifying the assignment of the bit planes as MSB, SSB and LSB, etc., it is possible to increase the number of bit planes which can be written to memory and strobed.

Distributed binary coding and the accompanying strategies discussed above have been found empirically preferable for certain liquid crystal formulations. Other algorithms may be better suited for other display matrices and are intended to fall within the scope of the present invention.

The backplane IC can include logic for performing a variety of algorithms. Such software control can also accommodate timing parameter changes which may be necessitated by temperature conditions or other factors.

Interrupts to the external frame buffer can also be provided to trigger the transfer of data to the next available memory plane.

3. Color Mixing

A third mode of operating a display matrix according to the present invention, referred to herein as color mixing, relates to the overlay of a color rich region on a power miser background. This mode of operation is illustrated in FIG. 18. By combining color rich operation with power miser operation, a window of high information content can be formed without incurring the bandwidth and power consumption costs associated with full-screen color rich operation. The reduction in bandwidth requirements improves the compatibility of the display matrix with video applications. An example of a color mixing procedure that may be employed is as follows:

The window region configuration registers are modified as necessary.

The power miser mode is specified to be either 3 color fields at 1-bit/field or 3-bit monochrome, by writing to the appropriate configuration register as necessary.

Color rich windowing is enabled by writing to the appropriate configuration register.

The window region is the area over which data will be displayed in color rich mode. The area around the outside of the window region operates in power miser mode. The window region is defined by the coordinates of its upper left $(X_{UL}, Y_{UL})$ and lower right $(X_{LR}, Y_{LR})$ corners. The coordinates must be specified with byte granularity, so that the possible values are 0–99 in the X-direction and 0–74 in the Y-direction. Values greater than 99 in the X-direction and 74 in the Y-direction are prohibited.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A display matrix comprising:
    a plurality of display elements, each display element including
        a pixel, and
        a display circuit electrically connected to the pixel including
            a plurality of memory cells, and
        a selector continuously electrically connected to more than one of the plurality of memory cells, the selector outputting to the pixel data from one memory cell at a time;
    wherein a first display element has a display circuit of second display element at least partially positioned inside a footprint of the pixel of the first display element.

2. The display matrix according to claim 1, wherein the plurality of memory cells includes at least 2 memory cells.

3. The display matrix according to claim 1, wherein the plurality of memory cells includes at least 3 memory cells.

4. The display matrix according to claim 1, wherein the plurality of memory cells includes between 2 and 9 memory cells.

5. The display matrix according to claim 1, wherein the plurality of memory cells includes at least 9 memory cells.

6. The display matrix according to claim 1, wherein the memory cells are static random access memory (SRAM) cells.

7. The display matrix according to claim 1, further including a data line electronically connected to both a first display circuit of a first display element and a second display circuit of a second display element, the data line enabling reading from and writing to the first and second display circuits.

8. A display matrix comprising:
    a plurality of display elements, each display element including
        a pixel, and
        a display circuit electrically connected to the pixel including
            a plurality of memory cells, and
        a selector continuously electrically connected to more than one of the plurality of memory cells, the selector outputting to the pixel data from one memory cell at a time;
    two or more data lines comprising a first data line which carries a bit signal, and a second data line which carries a bit bar signal, the data lines enabling reading from and writing to the first and second display circuits, each data line electronically connected to both a first display circuit of a first display element and a second display circuit of a second display element.

9. A display matrix comprising:
    a first display element including a first pixel, and
a first display circuit including a plurality of memory cells electrically connected to the first pixel;
a second display element including
a second pixel, and
a second display circuit including a plurality of memory cells electrically connected to the second pixel, the second display circuit being at least partially positioned within a footprint of the second pixel and within a footprint of the first pixel.

10. The display according to claim 9, wherein the first display circuit is at least partially positioned within the footprint of the second pixel.

11. The display matrix according to claim 10, further including a set of data lines is electronically connected to the first display circuit and the second display circuit, the set of data lines enabling reading to and writing from the first display circuit and the second display circuit.

12. A virtual image display system comprising:
a display matrix including a plurality of display elements, each display element including a pixel, and a display circuit electrically connected to the pixel and at least partially positioned outside of a footprint of the pixel, the display circuit including a plurality of memory cells, and a selector continuously electrically connected to more than one of the plurality of memory cells, the selector outputting to the pixel data from one memory cell at a time, wherein a first display element has a display circuit of second display element at least partially positioned inside a footprint of pixel of the first display element;
peripheral control circuits for controlling read and write operations to the memory cells; and
one or more magnification optics for magnifying the sub-images formed by the display matrix.

13. The virtual image display system according to claim 12, further including a light emitting mechanism provided at each pixel.

14. The virtual image display system according to claim 12, further including a light modulating mechanism provided at each pixel.

15. The virtual image display system according to claim 14, further including an illumination source for illuminating the pixels.

16. The display system according to claim 14, wherein the light modulating mechanism is a liquid crystal material.

17. A virtual image display system comprising:
a display matrix comprising a first display element including a first pixel, and a first display circuit including a plurality of memory cells electrically connected to the first pixel, a second display element including a second pixel, and a second display circuit including a plurality of memory cells electrically connected to the second pixel, the second display circuit being at least partially positioned within a footprint of the second pixel and within a footprint of the first pixel;
peripheral control circuits for controlling read and write operations to the memory cells; and
one or more magnification optics for magnifying the sub-images formed by the display matrix.

18. The virtual image display system of claim 17, wherein the first pixel is partially within the footprint of the second pixel.

19. The virtual image display system of claim 17, wherein a set of data lines is connected to the first display circuit and the second display circuit, the set of data lines enabling reading to and writing from the first and second display circuits.

20. The virtual image display system according to claim 17, wherein the display system is a display component of a device selected from the group consisting of portable computers, personal communicators, personal digital assistants, modems, pagers, video and camera viewfinders, mobile phones, and television monitors.

21. A method for reducing the number of address lines in a pixel-based display system, the method comprisng:
electrically connecting a plurality of display circuits to a plurality of pixels each having a footprint, each display circuit having an electrical connection to only one pixel, the plurality of display circuits controlling the operation of the plurality of pixels;
positioning the plurality of display circuits relative to the plurality of pixels such that at least a portion of the plurality of display circuits is positioned within a footprint of at least two pixels; and
connecting data lines to the plurality of data circuits to read and write data to the plurality of data circuits.

22. The method according to claim 21, wherein at least a portion of the plurality of data circuits includes at least 2 memory cells per data circuit.

23. The method according to claim 21, wherein at least a portion of the plurality of data circuits includes at least 3 memory cells per data circuit.

24. The method according to claim 21, wherein at least a portion of the plurality of data circuits includes at least 9 memory cells per data circuit.

25. The method according to claim 21, wherein at least a portion of the plurality of data circuits includes between 2 and 9 memory cells per data circuit.

26. The method according to claim 21, wherein positioning the plurality of display circuits includes positioning at least a portion of the plurality of display circuits within the footprint of at least three pixels.

27. A method for reducing the number of address lines in a pixel-based display system, the method comprising:
electrically connecting a plurality of display circuits to a plurality of pixels each having a footprint, each display circuit having an electrical connection to only one pixel, the plurality of display circuits controlling the operation of the plurality of pixels;
positioning the plurality of display circuits relative to the plurality of pixels such that a first display element has a display circuit of second display element at least partially positioned inside the footprint of a pixel of a first display element; and
connecting data lines to the plurality of data circuits to read and write data to the plurality of data circuits.

28. A method for reducing the number of address lines in a pixel-based display system, the method comprisng:
electrically connecting a plurality of display circuits to a plurality of pixels each having a footprint, each display circuit having an electrical connection to only one pixel, the plurality of display circuits controlling the operation of the plurality of pixels;
positioning the plurality of display circuits relative to the plurality of pixels such that at least a portion of the plurality of pixels have at least two display circuits positioned within the footprint of a given pixel; and
connecting data lines to the plurality of data circuits to read and write data to the plurality of data circuits.

29. A display matrix comprising:
a plurality of display elements, each display element including
a pixel, and a display circuit electrically connected to the pixel including
a plurality of memory cells, and
a selector continuously electrically connected to more than one of the plurality of memory cells, the selector outputting to the pixel data from one memory cell at a time;

wherein at least a portion of the display circuit is positioned within a footprint of at least two different pixels and the display circuit is electrically connected to only one pixel.

* * * * *